United States Patent [19]
Wagner et al.

[11] Patent Number: 5,920,312
[45] Date of Patent: Jul. 6, 1999

[54] SYSTEM AND METHOD FOR BUILDING TESTING AND INTEGRATING A GRAPHICAL DYNAKEY USER INTERFACE

[75] Inventors: Samuel J. Wagner, Lilburn; Gary R. Young, Dunwoody, both of Ga.

[73] Assignee: NCR Corporation, Dayton, Ohio

[21] Appl. No.: 08/742,005

[22] Filed: Oct. 31, 1996

[51] Int. Cl.⁶ .................................................. G06F 15/00
[52] U.S. Cl. ......................... 345/333; 345/962; 345/967
[58] Field of Search ................................. 345/333, 352, 345/353, 354, 340, 348, 962, 967

[56] References Cited

U.S. PATENT DOCUMENTS 5,353,219  10/1994  Mueller et al. ......................... 345/354
5,765,142   6/1998  Allred et al. ............................ 705/26

*Primary Examiner*—Huynh Ba
*Attorney, Agent, or Firm*—Needle & Rosenberg; Peter H. Priest

[57] ABSTRACT

A builder, tester, and runtime integration method for a Point-Of-Sale, Windows DynaKey™, or equivalent, interface that is less expensive than previous methods because: human interface and software personnel work in parallel in building and modifying the interface using NICE customized DKItem/DKList objects, a significant amount of interface maintenance is done without ever changing the runtime code since the interface is external, much of the code for the builder program and tester program is general-purpose, and most of the complex, event-driven runtime code is reusable.

13 Claims, 29 Drawing Sheets

FIG. 2A

```
┌─────────────────────────────────────────────┐
│  ┌───────────────────────────────────────┐  │
│  │ ▊ Sales Item Menu                     │  │     Item Quantity  ⌗
│  │                                       │  │
│  │ Scan, enter, or change item.          │  │     Price Override ◇
│  │                                       │  │
│  │ ┌──────────────────────┬─────────────┐│  │     Item Void ✕
│  │ │                      │            ▏││  │
│  │ ├──────────────────────┴─────────────┤│  │
│  │ │ ST# 1026 OP# 00000001 TE# 01 TR# 00003 │     Tender Void ✕
│  │ │ ZIPLOCK TE X                £49.41 ││  │
│  │ │   27 @  £1.03                      ││  │
│  │ │ BANANAS                       £.97 ││  │
│  │ │ 2.55lb Man. Wt. @ £.38/lb          ││  │
│  │ │                                    ││  │
│  │ │                                    ││  │
│  │ ├────────────────────────────────────┤│  │
│  │ │ Subtotal:                   £50.38 ││  │
│  │ │ Discount:                   £  .00 ││  │
│  │ │ Total:                      £50.38 ││  │
│  │ │                                    ││  │
│  │ │ Balance Due:                £50.38 ││  │
│  │ └────────────────────────────────────┘│  │     Go Back ◁
│  │ SALES                                  │  │
│  └───────────────────────────────────────┘  │
└─────────────────────────────────────────────┘
```

"Sales Item Menu" DKItem Screen

FIG. 2B

```
┌─────────────────────────────────────────────┐
│  ┌───────────────────────────────────────┐  │
│  │ ▊ Short Code Entry                    │  │
│  │                                       │  │
│  │ Enter short code number or highlight  │  │     Enter ▊
│  │ item and press <Enter>                │  │
│  │                                       │  │
│  │ ┌───────────────────┬────────────────┐│  │     Top ⎯△⎯
│  │ │ Short code number:│                ││  │
│  │ ├───────────────────┴────────────────┤│  │
│  │ │ Artichokes                4084     ││  │
│  │ │ Asparagus                 4080     ││  │     Bottom ⎯▽⎯
│  │ │ Beans                     4066     ││  │
│  │ │ Beets, Bunch              4539     ││  │
│  │ │ Broccoli, Bunch           4060     ││  │
│  │ │ Broccoli, Flowers         4096     ││  │
│  │ │ Brussels Sprouts, Bulk    4007     ││  │     Fast Up ⇞
│  │ │ Cabbage, Green            4069     ││  │
│  │ │ Cabbage, Red              4009     ││  │
│  │ │ Cabbage, Savoy            4555     ││  │
│  │ ├────────────────────────────────────┤│  │     Up △
│  │ │ Subtotal:                    £.00  ││  │
│  │ │ Discount:                    £.00  ││  │
│  │ │ Total:                       £.00  ││  │     Down ▽
│  │ │                                    ││  │
│  │ │ Balance Due:                 £.00  ││  │
│  │ └────────────────────────────────────┘│  │     Fast Down ⇟
│  │ SALES                                  │  │
│  └───────────────────────────────────────┘  │
└─────────────────────────────────────────────┘
```

"Short Code" DKList Screen

FIG. 2C

```
  Cash Payment                                                £50.38  ▷

Select or enter cash amount.
                                                              £51.00  ▷

Cash amount:       £                            |
                                                              £55.00  ▷
 ST# 1026 OP# 00000001 TE# 01 TR# 00001
 ZIPLOCK TE X                    £49.41
    27 @  £1.03                                               £60.00  ▷
 BANANAS                         £.97
   2.55lb Man. Wt. @ £.38/lb
                                                             £100.00  ▷

Subtotal:                    £50.38
   Discount:                    £  .00
   Total:                       £50.38

Balance Due:                 £50.38

SALES
```

"Cash Payment" DKItem Screen

FIG. 2D

```
  Additional Payment                             Additional Payment

Enter customer's additional payment
  amount.                                                    Reset  ◁
  Change Due: £.00

Additional amount:                           |

SALES
```

"Additional Payment" DKItem Screen

FIG. 2E

```
 📇 Cheque Removal

Remove cheque from slip printer.

┌─────────────────────┬─────────────────────┐
│                     │                     │
├─────────────────────┴─────────────────────┤
│ ST# 1026 OP# 00000001 TE# 01 TR# 00001    │
│ ZIPLOCK TE X                       £49.41 │
│   27 @  £1.03                             │
│ BANANAS                             £.97  │
│   2.55lb Man. Wt. @ £.38/lb               │
│                                           │
│                                           │
│                                           │
└───────────────────────────────────────────┘

┌───────────────────────────────────────────┐
│   Subtotal:                        £50.38 │
│   Discount:                        £  .00 │
│   Total:                           £50.38 │
├───────────────────────────────────────────┤
│   Balance Due:                     £50.38 │
└───────────────────────────────────────────┘

SALES
```

"Check Removal" DKItem Screen

FIG. 2F

```
      Messages                              Go Back ◁

Read message, then select function.

┌─────────────────────┬─────────────────────┐
│                     │                    │ │
├─────────────────────┴─────────────────────┤
│                  Message                  │
│                                           │
│ Please pick up your paycheck today        │
│ in the Administration Office between      │
│ 12 and 3 pm.                              │
│                                           │
└───────────────────────────────────────────┘

┌───────────────────────────────────────────┐
│                                           │
│                                           │
└───────────────────────────────────────────┘

┌───────────────────────────────────────────┐
│ ┌───────────────────────────────────────┐ │
│ └───────────────────────────────────────┘ │
└───────────────────────────────────────────┘
                                  Send Message ▷
 SALES
```

"Message" DKItem Screen

FIG. 3

```
1, TEXT,iScreenNum,iTitle,chTitleIcon,iInstr1,iInstr2,iInstr3,iScreenType,iListNum,iLastScreen,iLastButton,iPrompt1,iPrompt2
2,DYNAKEY,iButton,iLabel1,iLabel2,chIcon,bEnable,iFunctionW,iLowW,iHighW,iNextScreenW,usBlackboardW,iFunctionWO,
        iNextScreenWO,usBlackboardWO
3,ENVIRONMENT,bScan,bScale,bMsr,bMicr,bOut,bNull,bKey,bEcho,bReceipt,bTotal,bKey11,bKey12,..,bKey33,bKey43,bKey53
4.ENTER,SCANNER,MSR,MICR,FORM_EMPTY,NULL_ACTION,iRelative,iFunctionW,iLowW,iHighW,iNextScreenW,
        usBlackboardW,iFunctionWO,iNextScreenWO,usBlackboardWO
1,6,29,BARCODE,30,0,0,1,0,0,0,0,0
2,1,31,0,QUANTITY,T,148,1,10,6,0,147,7,0
2,2,32,0,PRICECHG,T,155,1,10,6,0,154,8,0
2,3,33,0,X,T,0,1,10,0,0,156,9,0
2,4,26,0,X,T,0,1,10,0,0,313,10,0
2,8,515,0,LEFT,T,0,1,10,0,0,9,0,2
3,T,F,F,F,F,F,T,T,F,F,F,T,T,T,F,T,T,T,F,T,T
4,1,150,1,10,0,1109,3,0,0
4,2,150,1,13,0,1109,1,0,0
```

Subset Of "autopos.csv" File Corresponding To "Sales Item Menu"

FIG. 5

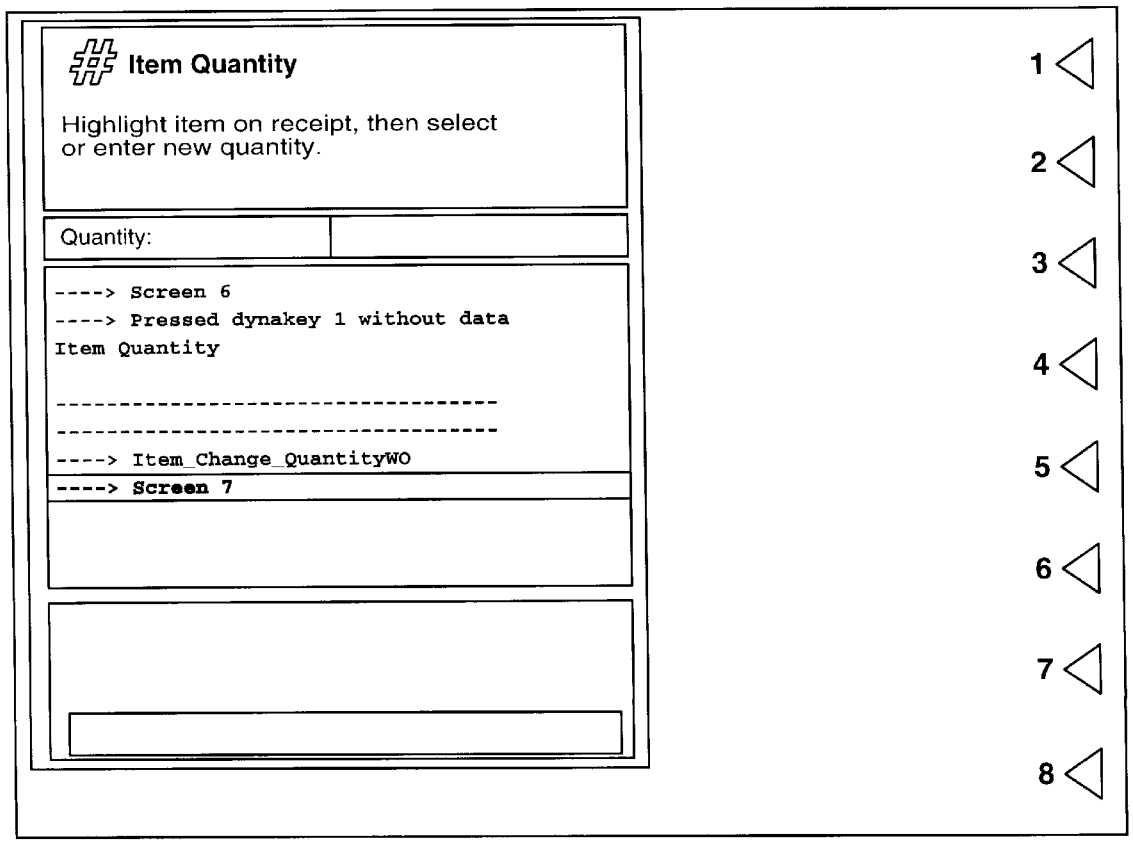

Tester Example: Dynakey 1 On Screen 6 Without Data

FIG. 4

| Date 06/17/96 | Time 04:55 PM | Item Menu 6 | | Page 1 |
|---|---|---|---|---|
| | | | | |
| Sales Item Menu (BARCODE) | w Item_Change_QuantityW | 6 | 1-10 |
| | 1. QUANTITY      Item Quantity | | |
| | w/0 Item_Change_QuantityWO | 7 | |
| | | | |
| | w Item_Price_ChangeW | 6 | 1-10 |
| | 2.PRICECHG      PriceOverride | | |
| | w/0 Item_Price_ChangeWO | 8 | |
| | | | |
| | w A_Error_DataW | 0 | 1-10 |
| | 3.X                 Item Void | | |
| | w/0 Item_VoidWO | 9 | |
| | | | |
| | w A_Error_DataW | 0 | 1-10 |
| | 4.X                Tender Void | | |
| | w/0 Tender_VoidWO | 10 | |
| | | | |
| | 5. | | |
| | | | |
| | 6. | | |
| | | | |
| | 7. | | |
| | | | |
| | w A_Error_DataW | 0 | 1-10 |
| | 8.LEFT           Go Back | | |
| | w/0 Backup_To_New_Transaction2WO | * | |
| | | | |
| | w Item_EntryW | ** | 1-10 |
| <ENTER> | | | |
| | w/0 A_Error_EnterWO | 0 | |
| | | | |
| | w Item_EntryW | ** | 1-13 |
| <Scanner Enable> | | | |
| | w/0 A_Error_DataWO | 0 | |
| * | 0\NEW_TRANSACTION | | |
| ** | 0\ITEM_ENTRY\PLU_WEIGH\ITEM_MISSING\ITEM_ALERT | | |
| | DKITEM | | |

Printout of "Sales Menu Item" DKItem Screen

FIG. 7A
FIG. 7C
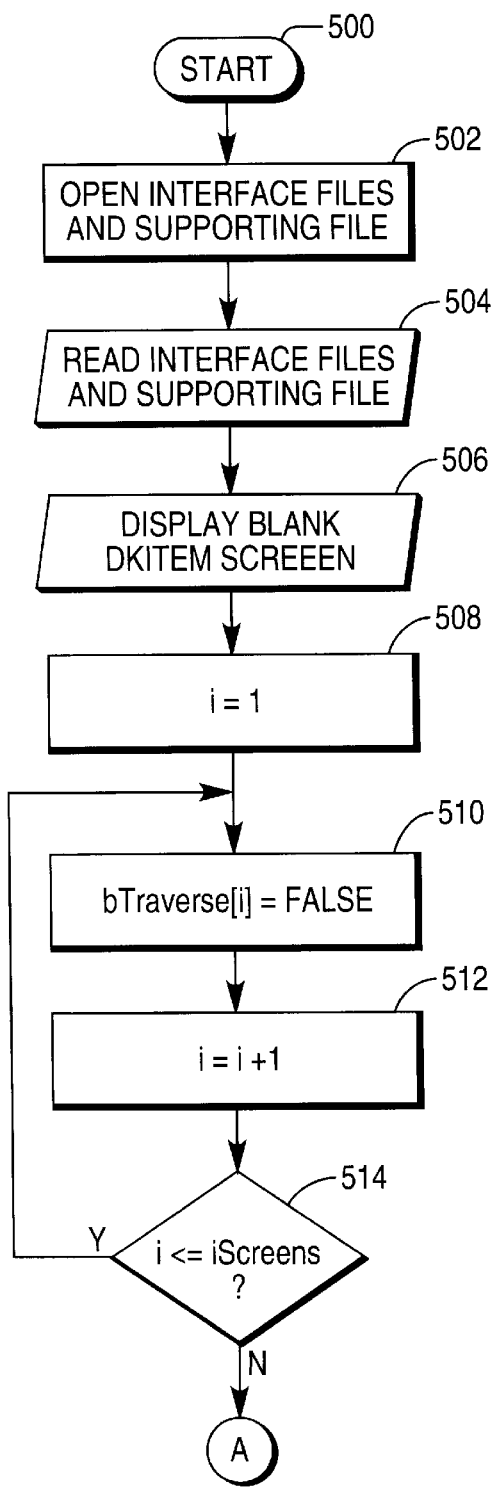
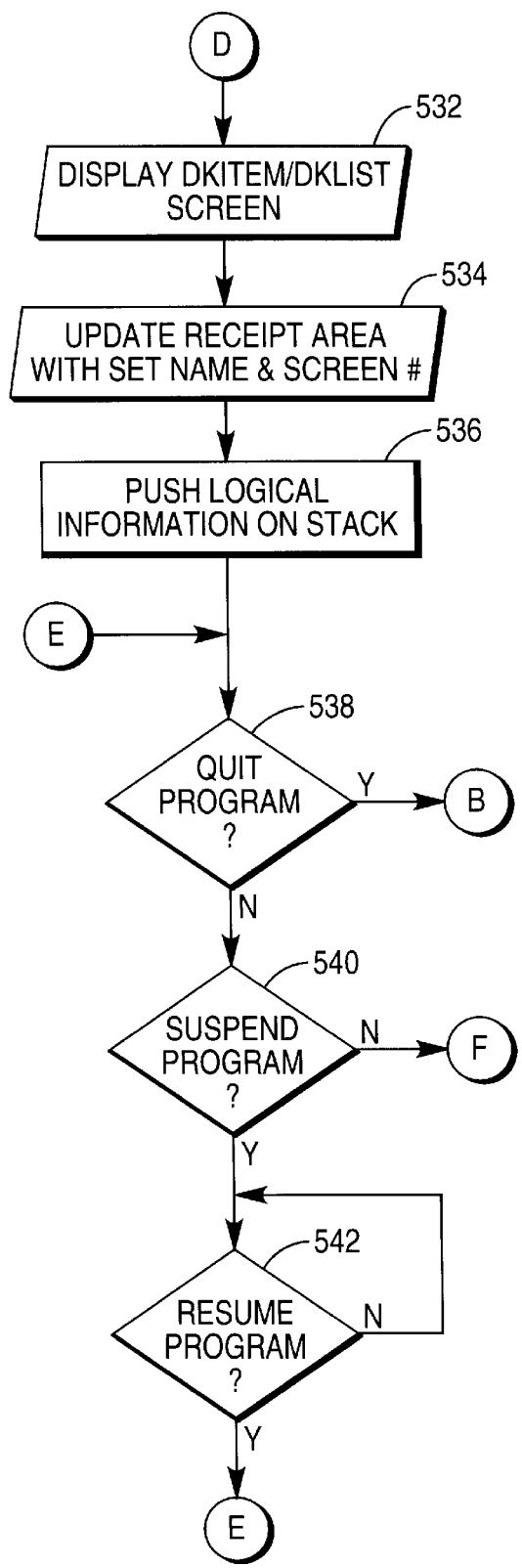

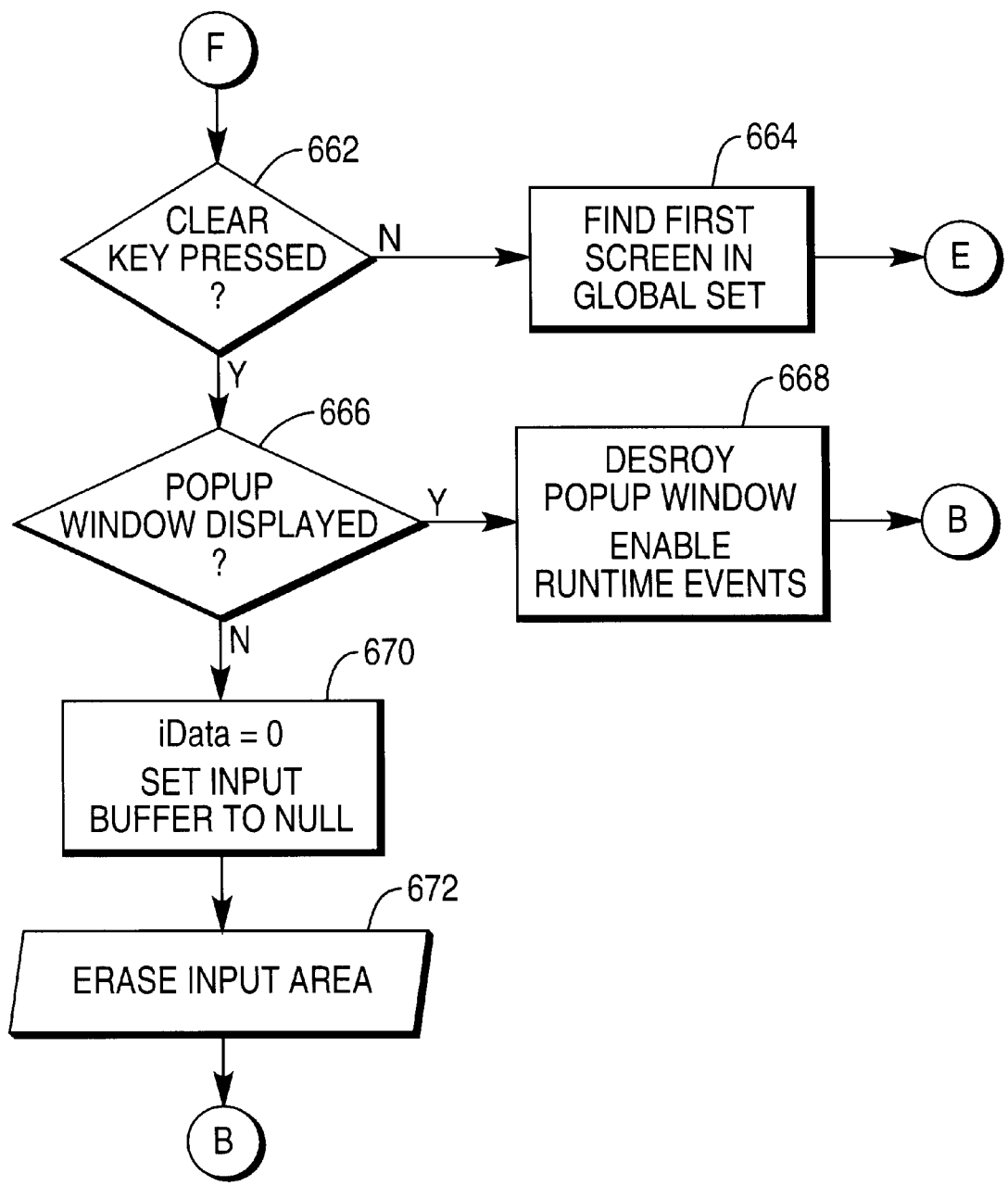

SYSTEM AND METHOD FOR BUILDING TESTING AND INTEGRATING A GRAPHICAL DYNAKEY USER INTERFACE

BACKGROUND OF THE INVENTION

1. Field of the Invention

The present invention generally relates to the building, testing and integration of graphical user interfaces (GUI), and in one embodiment to a Dynakey™ point-of-sale (POS) user interface whereby the interface design, testing and maintenance is performed external to run-time code.

2. Description of the Prior Art

In recent years, graphical devices have appeared in a variety of places. One such device designed for "checkout" retailers is the NCR DynaKey™ POS device. This product was designed specifically to reduce training time, to reduce POS operator errors, and to increase operator productivity.

The DynaKey™ device has 8 physical keys that are positioned to the immediate right of the LCD screen. These keys are dynamic in that the two line labels and optional icon appear to the immediate left of the each dynakey and this information can be changed as various screens appear on the LCD. Also, the device has physical keys called global keys that allow for switching from one group of screens to another. In addition, there are physical keys to input data. And, finally, there are two cursor keys that are used to scroll up and down within an electronic receipt. The software for the device is aided by the NICE DKItem and DKList screen objects, each of which is a collection of NICE controls. Each screen layout is a common one with a title area and icon, an instruction area, a prompt area, an input area, an electronic receipt area, a subtotal area, a total area, and all of these appear on the left-hand side of the screen. On the right-hand side of each screen are the labels and icons that correspond to each dynakey in use.

For new POS applications, Human Interface (HI) personnel typically design more than 100 of these LCD screens. The problem, then, arises as to how a design is best communicated to customers and to software engineers. One current approach is to have HI personnel use a tool like Microsoft® PowerPoint® to layout the interface. The problem, of course, is that this work does not contribute directly to the final interface. In other words, the programmer must take the HI design and then start programming. Furthermore, as with any design, there will be design iterations that further compound the problem.

A better approach is to have HI personnel use a builder tool (hereinafter referred to as the "builder", "builder tool" and/or "<B>") that utilizes Windows, menus, dialogs, and the DKItem and DKList objects to build the interface. The idea is to allow for a non-programmer to build the interface accurately and quickly. Then, this actual external interface can be read by a skeleton, runtime system (hereinafter referred to as the "runtime system" and/or "<R>") that has just a few dummy Entry Level Logic (ELL) functions defined. The result is that HI personnel can very quickly get feedback on how the interface will actually look-and-feel. Also, HI personnel have the capability to correct errors and make improvements themselves as they fine-tune the interface. And, by providing a general-purpose tester program (hereinafter referred to the "tester", "tester tool", and/or "<i>"), HI personnel have another way to judge their work by watching the system run as if a human were pressing the various dynakeys and using the various peripherals such as the scanner. If the designers inadvertently forget to build a particular screen, then <T> will inform them of the mistake, and they can again use <B> to correct the problem. Software personnel can also use <T> to check that the proper ELL functions are specified as the system is designed and built.

Finally, as DynaKey™ systems are deployed to customer sites, it is desirable that the interface can be modified in many cases without changing <R>. For example, one might want to interchange the functionality of two dynakeys.

Therefore, it would be desirable to provide a method for building, testing, and integrating a DynaKey™ interface into the runtime system that is less expensive than previous methods, is more accurate in going from design to implementation, and enables non-programming personnel to do a significant amount of the design and maintenance work.

SUMMARY OF THE INVENTION

In accordance with the teachings of the present invention, a general system and method for creating a NICE DynaKey™ POS external interface is provided, a system and method of testing the interface paths is provided, and a system and method of integrating the interface into the runtime system is shown.

The method of creating the DynaKey™ interface includes the steps of choosing the proper screen set and then building its screens one-at-a-time. The method of creating an individual screen includes the steps of declaring the screen type, entering in the screen text, choosing the screen icons, selecting all the ELL functions and the data size range for the cases where data is to be entered, indicating which of the global keys and peripherals can be used, and assigning the local and non-local screen branching that is needed.

The method of testing the interface is to test each set of screens in the external interface. The testing begins by placing in the receipt area of the first screen set the screen set name and the beginning screen number. Then, the active dynakey and peripheral logical information is placed in a stack structure so that the first dynakey's data is on the top of the stack. Next, the stack is popped and its pertinent logical information is placed in the DKItem/DKList receipt area for a few seconds, branching then takes place, the new screens' logical information is placed on top of the stack, and the top item is again popped off the stack. The process continues until all of a screen set's branching has been done. If a particular screen is every redisplayed, then none of its logical data is placed on the stack a second time. If branching is to another screen set, then only that screen set name is displayed. Then later, the other screen set is tested. If a screen number does not exist, then its number is placed in a popup window along with an error message. The tester can be paused at anytime by, for example, pressing the space bar, and can be terminated by, for example, pressing a digit key.

The method of integrating the external interface into a runtime system begins by performing a series of steps that read and store the interface into program structures in memory. Next, the first DynaKey™ screen is painted by creating either a DKItem or DKList object using information in the external file to formulate the necessary Windows commands to cause the screen object to be displayed properly. Next, the steps that map the ELL function code to the execution of the right function are given. Finally, the steps to determine the next screen to be displayed on the LCD are given.

The method of the present invention is highly efficient since human interface and software personnel work in parallel to create the actual external interface and because most of the interface creation can be performed by using menus and dialogs couched in the familiar Windows environment.

It is another object of the invention to have a general-purpose tester program that visually tests all the screen branching while providing information in the testing screen's receipt area that the software and human interface personnel can view.

It is still another object of the invention to have much of the complex code in the runtime system be made reusable. This includes the code to paint the windows on the DynaKey™, the code to process event-driven messages, the code to invoke ELL functions, and the code to create and delete DKItem and DKList screens.

BRIEF DESCRIPTION OF THE FIGURES OF THE DRAWINGS

FIG. 2A through FIG. 2F show common DKItem and DKList retail screen examples.

FIG. 3 gives the external interface language for the FIG. 2A object.

FIG. 4 gives a readable printout for the FIG. 2A object.

FIG. 5 is a visual example of the tester <T> program.

FIGS. 7A through 7E are flowcharts for testing the branching specified in the DynaKey™ external interface.

FIGS. 8A through 8J are flowcharts for integrating the interface into a particular POS runtime system.

DETAILED DESCRIPTION OF THE INVENTION

Figure 1A:
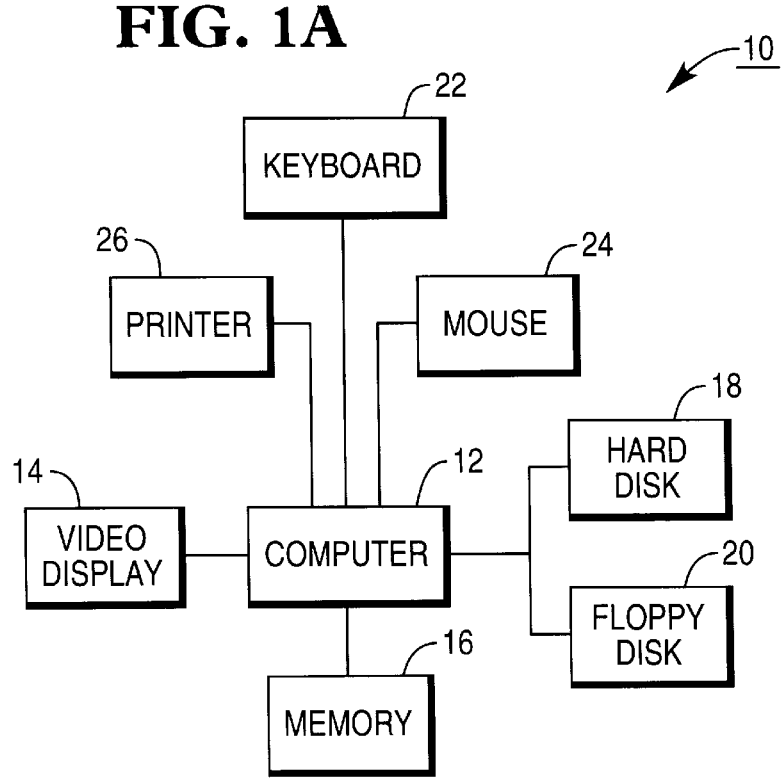
FIG. 1A is a block diagram of a developmental system and FIG. 1B is the associated block diagram of a retail DynaKey™ system.

Referring now to FIG. 1A, system 10 is used for building, maintaining, and testing the external interface. It includes computer 12, CRT 14, memory 16, hard disk 18, floppy disk 20, keyboard 22, mouse 24, and printer 26.

Figure 1B:
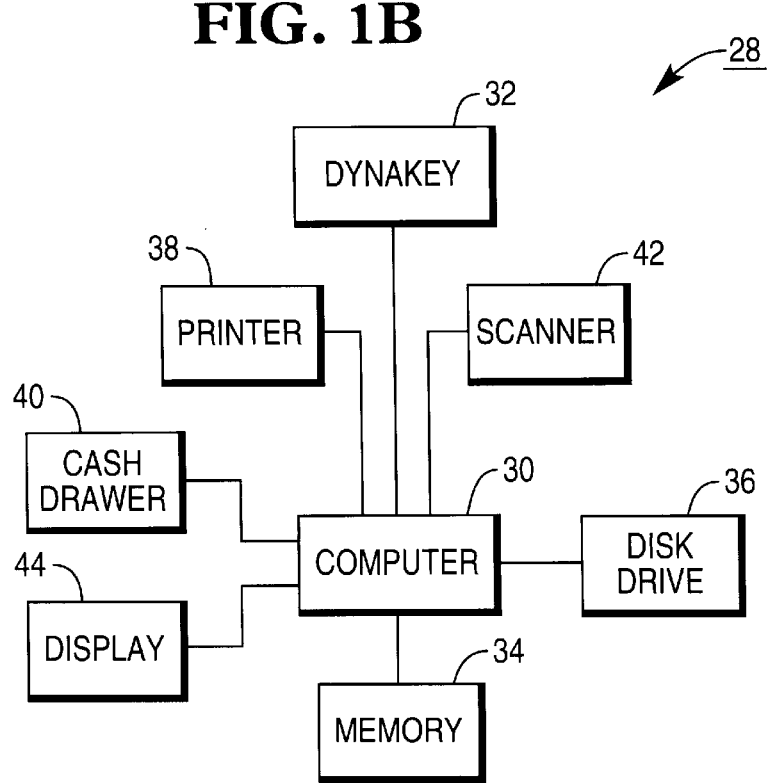

Referring now to FIG. 1B, system 28 is the retail system and may include computer 30, DynaKey™ 32, memory 34, disk 36, printer 38, cash drawer 40, scanner 42, and 2×20 display 44.

In the preferred embodiment, system 10 is a typical developmental system with computer 12 being an Intel® 486 or Pentium® computer, CRT 14 is a VGA monitor, memory 16 is at least 16 MB of RAM, hard disk 18 has at least 1.2 GB of secondary storage, floppy disk 20 uses 3.5" flex disks, keyboard 22 is a common PC keyboard, mouse 24 is a Microsoft® mouse or equivalent, and printer 26 is a laser or ink jet printer that is PC compatible.

In the preferred embodiment, system 28 is a DynaKey™ system used in retail. Computer 30 is an NCR 7450 PC or it can be an ordinary Intel-based PC, DynaKey™ 32 is a 10-inch NCR DynaKey™ (color or monochrome), memory 34 is 16 MB of RAM or more, disk 36 is optional and is at least 500 MB of secondary storage, printer 38 is an NCR printer or equivalent, cash drawer 40 is an NCR cash drawer or equivalent, scanner 42 is an NCR 7870 or NCR 7890 scanner or one from another vendor, and 44 is a 2×20 display from NCR or another company.

In FIGS. 6A through 6L the builder tool <B> is used to build a new or modify an existing DynaKey™ interface. Before considering the specifics of the flowchart, a few high-level comments. First, as mentioned before, the interface is external and consists of five ASCII files. The first file, whose filename suffix is ".csv", is the main file and is a comma separated variable file. This text file has four different record types for each DKItem or DKList screen. For example, to represent the "Sales Item Menu" screen 201 shown in FIG. 2A, consider FIG. 3. First, notice there are four heading lines 301–304 that appear first in each ".csv" file 300. These provide documentation for the various record fields. Next, observe there is one "1" record 311, five "2" records 312, one "3" record 313, and two "4" records 314 where the first field in each line is the record type. A "1" record exists for each DKItem/DKList screen, the number of "2" records corresponds to the number of dynakeys that are in use for the screen, one "3" record is always used, and the number of "4" records varies, but there is always one.

Briefly, the first record type is primarily used to encode non-dynakey screen text, where the text is encoded as a number. If the text number is zero, then the meaning is that the text field is not used. The second record type encodes screen dynakey information for each dynakey in use. The third record type gives which global keys and peripherals can be accessed when the screen appears on the DynaKey™ as well as a few other things which will be discussed later. The fourth record type gives <Enter>, peripheral, and other event-driven logic information that is similar to that found in the dynakey "2" record type.

The second interface file, whose filename suffix is ".dat", is a data file and is directly related to the first interface file. For example, within the "1" record 311 in FIG. 3, the third field has a value of 29. This means in the ".dat" file the 29th record contains the title text of "Sales Item Menu". Refer again to FIG. 2A and notice that the screen title field 202 contains this exact text.

The third interface file, whose filename suffix is ".key", gives the global key labeling that will be used, the screen set names, and other information used by <B> and <R>.

The fourth interface file, whose suffix is ".1st", contains the first screen number to be displayed on the DynaKey™. The initial value comes from <B>, but later <R> can modify this value.

The fifth interface file, whose filename suffix is ".fin" denoting an abbreviation of the word finish, is used only by <B> and enables the builder to be terminated before all the screens are built. Then, when <B> is restarted the stack information kept within the file is used by <B> to continue the screen construction.

Referring again to the flowcharts in FIG. 6A through FIG. 6L, <B>'s execution starts at block 100 and then continues to block 102 where an inquiry is made to decide whether to create a new interface or open an existing one. The implementation for the inquiry is done by constructing a Windows File Menu with "New" and "Open" selections.

Suppose when executing block 102, the result of the inquiry is "yes", meaning a new interface is to be created. Then, blocks 104 through 114 are executed next. In block 104, the new interface prefix name is set to "autopos1", so later the five file names comprising the interface have this same prefix. One of the new interface files is assumed to already exist and this is the "autopos1.key" ASCII file. Each record in this comma separated variable file has nine fields and is associated with a screen set. The first two fields contain the screen set name. If the second name is not used, then the text is "NA". Some of the sets are associated with the global keys on the DynaKey™ and other are not. The third and fourth fields give the location on the DynaKey™ in terms of row and column. If the screen set is not a global key, then these two field values are zero. The fifth field value is 1 if the screen set can be branched to from another set and zero otherwise. For example, if a global key is used for miscellaneous work, then typically it cannot be branched to from within another screen set. On the other hand, the "Item,Menu" set, which is the set of screens used in purchasing items, is often branched to from other screen sets. The sixth field is referred to as the "blackboard" field and has a value of one if in use. The meaning of this field is explained later. The seventh field gives the beginning screen number in the set. Initially, this value is zero and is modified when the screen set is constructed by <B>. The eighth field is used to give the function number associated with the global key labeling placed on the DynaKey™ Some of the entries, however, in the ".key" are not related to a global key, so these entries have a field value of zero. The usefulness of this field will become apparent when the <R> flowchart is presented. The ninth, and last, field value is zero for each entry in the file except for the set that is to be constructed first.

Continuing, block 106 is executed and the interface files are opened. In addition, the one supporting file that contains the ELL names is opened. Next, block 108 is executed and the "autopos1.key" input interface file and the "keylogic.dat" supporting file are read. The pertinent record information for these files is then stored in two different array of structures. Next, block 110 is executed and the variable "iCurrentScreen" is initialized to 1 and the "iLastScreen" and "iLastButton" variables are initialized to 0. These three variables appear in the receipt area of every displayed DKItem/DKList screen that is built. The information aids in helping to keep track of how the current CRT 14 screen is related to a previous screen. After the screen is constructed, the three values are stored as part of the "1" record in the ".csv" interface file.

Figure 6A:
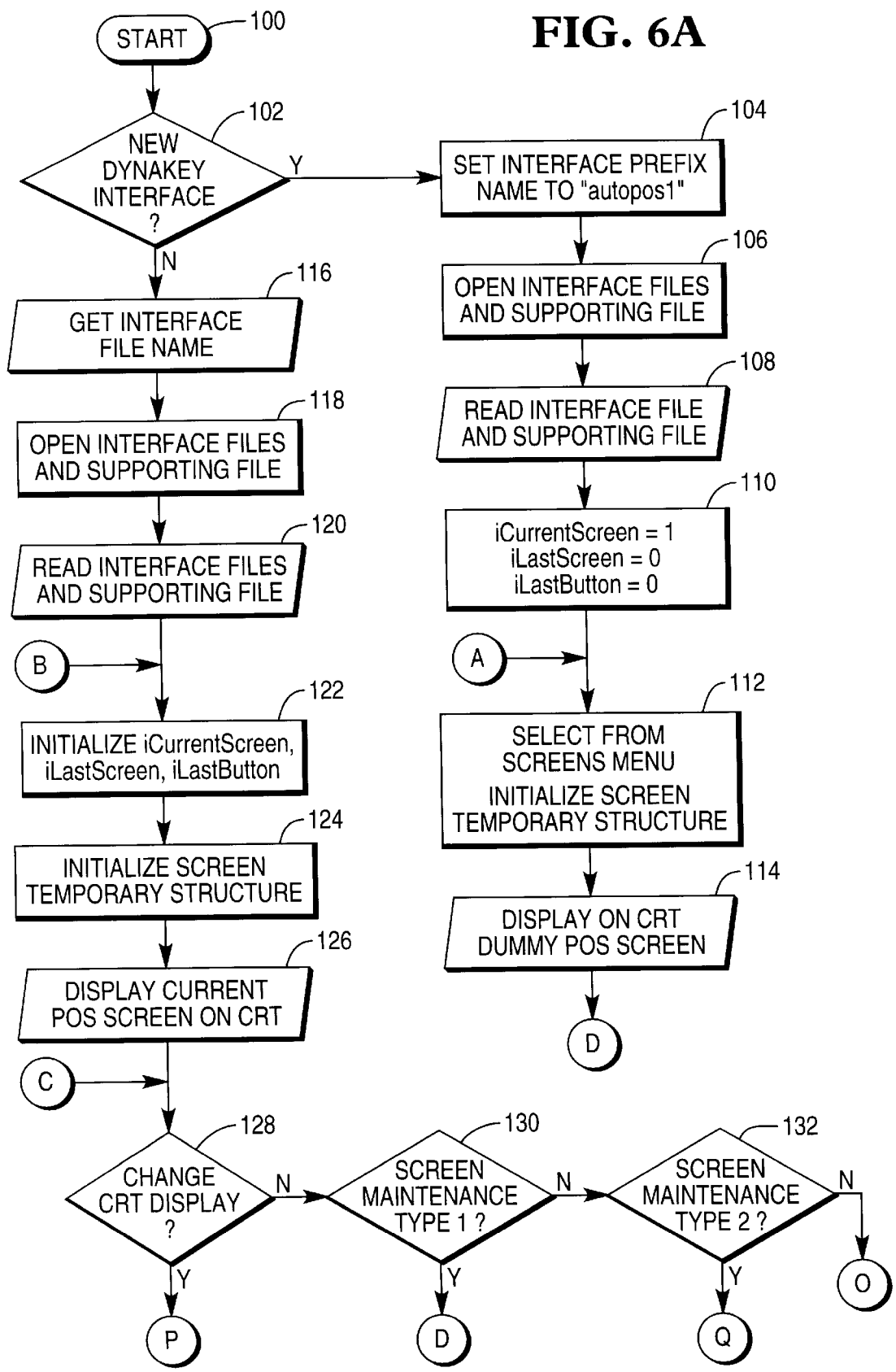
FIGS. 6A through 6L are flowcharts for building the external DynaKey™ interface.

Continuing, notice the connector A that points to block 112 in FIG. 6A. The connector is needed because after each new screen is built, more new screens usually need to be constructed. Therefore, the need to branch back to A from a subsequent FIG. 6 flowchart. Once block 112 is executed, two things take place. First, a selection is made from the Screens Menu indicating which type of screen should be built, be it DKItem or DKList. As the selection is made using the mouse, the menu item is checked using the familiar Windows method of doing this. Second, once the screen type is known the temporary structure for the screen is initialized. Essentially, this initializes the title text for the screen to be either "DKItem Stub" or "DKList Stub". All the rest of the screen text is set to the null string and none of the dynakeys are presumed to be in use. Next, block 114 is executed and the particular NICE screen is painted on the CRT 14 using the initial title text. Also, on the CRT 14 screen, and within the receipt area, are two lines of text. For example, the first time block 114 is executed the first line is the string "Current Screen: 1" and the second line is the string "Last Screen: 0 Last Button 0". Continuing, a branch is then made to connector D in FIG. 6B. More about this flowchart later.

Suppose the result of the inquiry at block 102 is "no". Then, an existing interface is to be modified and the preliminary steps in blocks 116 through 126 are executed. First, the execution of block 116 results in the proper ".csv" interface file being selected. The block is implemented by having the user select the "Open" menu item from the File Menu. Then, by using a Windows common file dialog approach one can easily select from all the existing ".csv" files that reside in a specific directory on disk. Continuing, program execution continues to block 118 where the five interface files and the one supporting file are opened. Next, control passes to block 120 where all the input record information is read and stored into various arrays. The next block executed is block 122 and this block is pointed to by the connector B. The reason for the connector will become apparent as the teaching unfolds. For now, the assumption is that the first set constructed is the one whose first screen will be initially displayed. However, in general, if the ".fin" file has new screens to be built, then a dummy screen is displayed that utilizes the first ".fin" record information. Continuing, when block 122 is executed the "iCurrentScreen", "iLastScreen", and "iLastButton" values are initialized. This information comes from the screen associated with the ".key" file record whose last field value is one. Or it can come from the ".fin" file. Next, block 124 is executed and the screen's temporary structure is updated using the current screen information. Lastly, block 126 is executed and the current screen is painted on the CRT 14 with its text and icon information.

Once blocks 116 through 126 are executed, an inquiry is done at block 128. Notice, the block is pointed to by connector C. The connector is needed as <B> allows subsequent modifications to be done to any screen just modified. Continuing, if the result of the inquiry at block 128 is "no", meaning that the current screen is to be modified, then block 130 is executed. If the result of this inquiry is "yes", meaning the seven Layout Menu selections are to be used to further modify the displayed screen, then a branch is made to D as was done after block 114 was executed. Again, more about this later. If the result of the inquiry at block 130 is "no", then block 132 is executed. If the result of this inquiry is "yes", then the Maintenance Menu items are to be used to alter the displayed screen and a branch is made to connector Q in FIG. 6L. This flowchart is explained later. If the result of the inquiry is "no", then a branch is made to connector O in FIG. 6J to optionally save the file and to decide what to do next. Again, this flowchart is explained later.

Refer back to block 128. If the result of the inquiry is "yes", indicating a new screen set or individual screen is to be accessed, then a branch is made to connector P in FIG. 6K to do the steps involved in the selection. This flowchart will be explained later. This concludes the teaching of the FIG. 6A flowchart. We are now left with explaining the steps associated with the two screen maintenance menus, the use of the screen set selection menus, and the saving of the interface to disk.

Figure 6B:
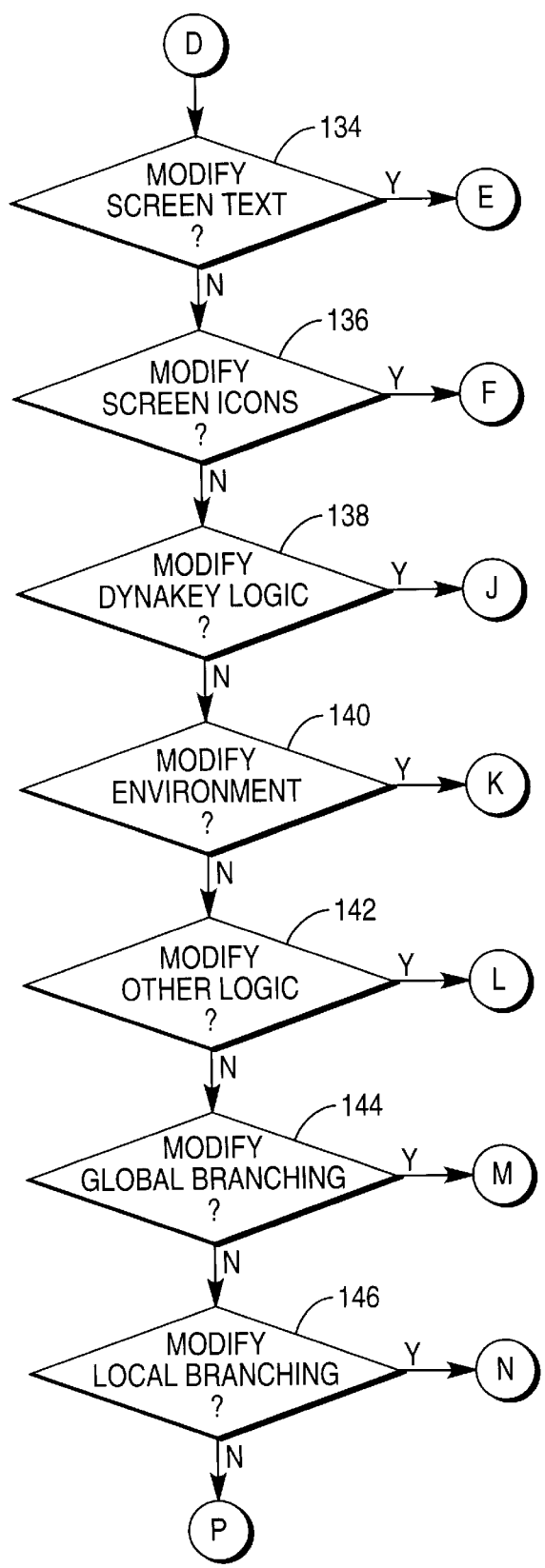

Refer now to FIG. 6B. Remember that a branch is made to connector D in the FIG. 6B flowchart in two cases. The first is after block 114 in FIG. 6A is executed and is when a new screen is to be constructed. The second is when an existing screen is to be modified using some or all of the same Layout Menu selections. Continuing, a series of inquiries is done in blocks 134 through 146 to see which of the seven Layout Menu selections are to be used in conjunction with the current displayed screen on the CRT 14. If the result of any of the inquiries is "yes" then a branch is made to connector E, F, J, K, L, M, and N respectively. These connectors appear in sequential order in the subsequent flowcharts FIG. 6C through FIG. 6I. These flowcharts are explained shortly. If the result of all the FIG. 6B inquiries are "no", then a branch is made to connector P in FIG. 6K. Here, a new screen set or individual screen can be accessed before subsequent modifications. The branch to P is given for completeness to show an escape path should the user first decide to use the Layout Menu and then change their mind. Now, to examine the seven Layout Menu selections beginning with FIG. 6C.

Figure 6C:
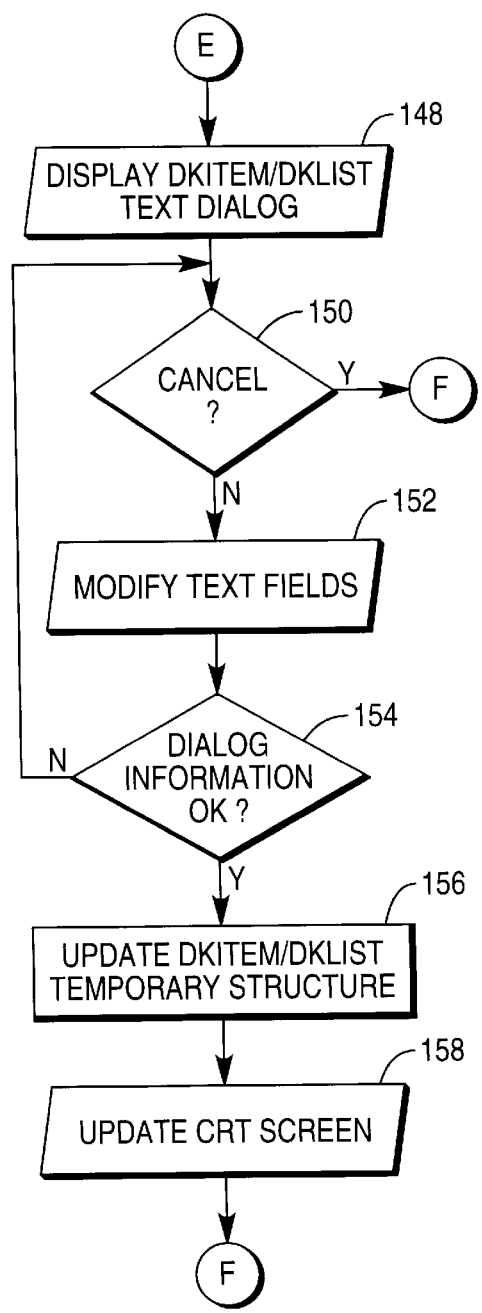

The purpose of the FIG. 6C flowchart is to display a dialog on top of the current CRT 14 screen with the current text information displayed along with identifying text. For example, refer back to the LCD display in FIG. 2A. The first text field is the title field and the text is "Sales Item Menu". The second text field consists of three lines of instruction and in this case only the first is used. Its contents are "Scan, enter, or change item.". The next two fields are adjacent fields. The left-most field is a prompt field and the right-most field that appears to be recessed is the input field. The reason the input field can be given text is to allow for a default value when the screen is first displayed. The rest of the text fields pertain to the eight dynakeys and each dynakey can have a two line label. If the dynakey is to be used at all, then one of the two lines must be non-blank.

Now to examine the FIG. 6C flowchart. Block 148 is executed first and the text dialog is displayed using the temporary structure information to display the existing text. Next, an inquiry is done at block 150. If the result of the inquiry is "yes", then any changes made on the dialog are discarded and a branch is made to connector F in FIG. 6D to use the second Layout Menu selection. If the result of the inquiry is "no", then block 152 is executed and the text fields are modified. This process requires the mouse and keyboard be used as is done for normal word processing. Then, an inquiry is done at block 154 to see if the dialog contents are correct. If the result of the inquiry is "no", then a branch is made back to block 150 to see whether the dialog is to be canceled or more text changes are to be made. If the result of the inquiry is "yes", then block 156 is executed and the current dialog contents are used to update the DKItem/ DKList temporary structure. However, the changes are not made permanent until the last Layout Menu selection is finalized. Next, block 158 is executed and the current CRT 14 screen text fields are modified. Finally, a branch is made to F to perform the steps that correspond to the second Layout Menu selection. This concludes the FIG. 6C teaching.

Figure 6D:
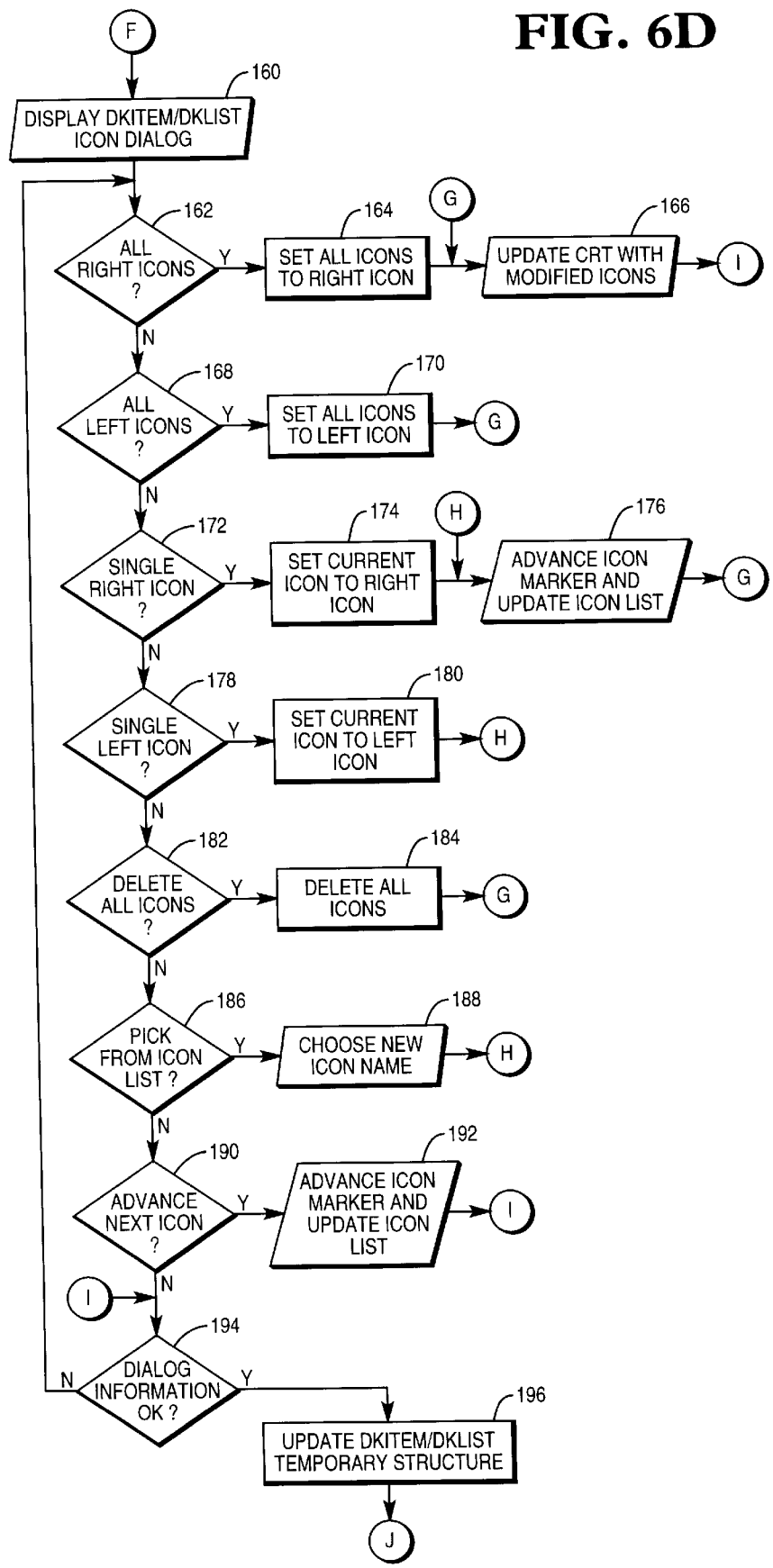

The purpose of the FIG. 6D flowchart is to display an icon dialog on top of the current CRT 14 screen. Icons can be assigned to the title line and to each of the active dynakeys that have been given text via the first Layout Menu selection. The beginning state of the dialog causes a "→" marker to be placed to the left of the "Title Icon" dialog text. After this text are the "Dynakey 1" through "Dynakey 8" text lines. A list box on the dialog contains the NICE icon names appearing in alphabetical order. Above the list box is the current icon name for the title line and if none is used, the default icon name "right" appears. Also, this name is highlighted in the list box.

Refer now to block 160 in FIG. 6D. When block 160 is executed, the icon dialog is displayed on top of the current CRT 14 screen but the current screen icons are still visible. Next, block 162 is executed to see if all the icons should be set to the "right" icon name. This is a short cut method of setting all the icons to a common icon name rather than setting them one at a time. If the result of the inquiry is "yes", then block 164 is executed and the active icons within the temporary structure are all given the name "RIGHT". This name appears in the ".rc" file and is matched with the correct path within the NICE disk directory and the actual "right.ico" filename. Next, block 166 is executed. The result is that the DKItem/DKList screen is updated immediately to give user feedback. Then, a branch is made to connector I in FIG. 6D where block 194 is executed. If the result of the inquiry is "no", then more dialog changes are to be made and a branch is made back to block 162. If the result of the inquiry is "yes", then block 196 is executed and the temporary screen structure is updated. Next, a branch is made to connector J in FIG. 6E to do the third Layout Menu work. This flowchart will be discussed when the current flowchart teaching is completed.

Refer again to block 162 in FIG. 6D. If the result of the inquiry is "no", then block 168 is executed. If the result of this inquiry is "yes", then block 170 is executed. This block is similar to block 164 except all the active icon names become "LEFT" instead of "RIGHT". Then, a branch is made to G and this part of the flowchart has already been explained. If the result of the inquiry at block 168 is "no", then block 172 is executed. If the result of this inquiry is "yes", then block 174 is executed. This time only the current icon is changed to "RIGHT". Next, block 176 is executed and the icon marker is advanced and the list box is changed to reflect the new icon name. Also, the box above the icon box is given the new icon name as well. Then, a branch is made to G as before. Continuing, if the result of inquiry at block 172 is "no", then block 178 is executed. If the result of this inquiry is "yes", then block 180 is executed before a branch is made to connector H. This time, however, the current icon name is set to "LEFT" before the wrap-up work is done. If the result of the inquiry at block 178 is "no", then block 182 is executed. If the result of this inquiry is "yes", then block 184 is executed and all the icons names are set to null before a branch is made to connector G. If the result of the inquiry at block 182 is "no", then no icon shortcuts are to be done and block 186 is executed. If the result of this inquiry is "yes", then block 188 is executed. The implementation of this block is to have the user type in the dialog box above the list box the new icon choice. As each character in the name is typed, the effect is seen in the list box and a name will be highlight if its first characters match what has been typed. In this way, the user does not have to type the entire name in most cases. Continuing, a branch is made to H since this is a single icon change also. If the result of the inquiry at block 186 is "no", then block 190 is executed. The purpose of this block is to advance the icon marker to the next eligible icon text line, be it the title text or dynakey text. The implementation of the block is to use a "Next" button on the icon dialog. Continuing, if the result of inquiry at block 190 is "yes", then block 192 is executed before a branch is made to I. The result is the icon marker is advanced, another icon name is highlighted in the list box, and the new name is placed in the box appearing above the list box. Then, as before, block 194 is executed to see if more icon changes need to be made. This concludes the FIG. 6D flowchart teaching.

Figure 6E:
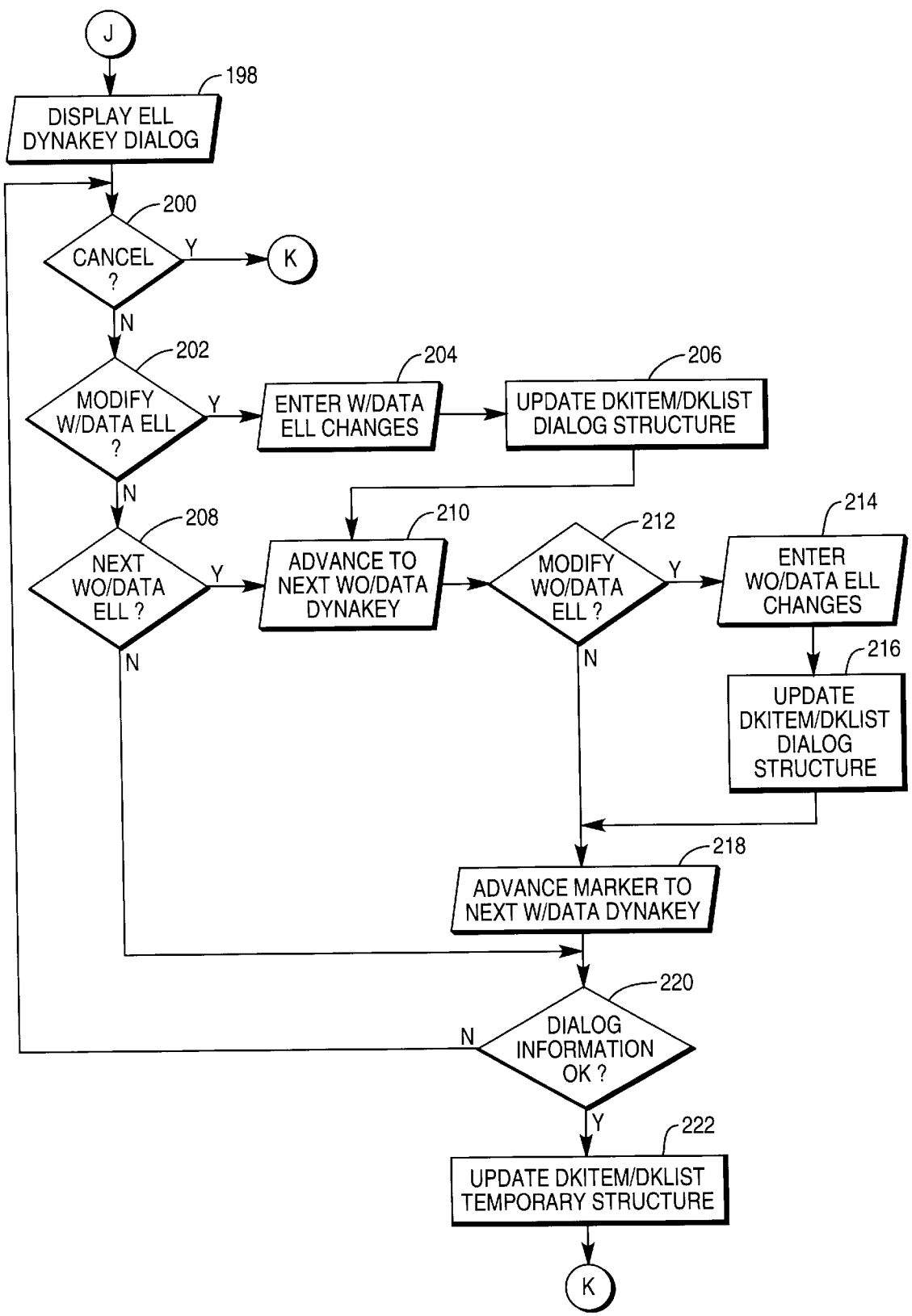

The purpose of the FIG. 6E flowchart is to place the ELL dynakey dialog on top of the current CRT 14 screen and allow for ELL modifications. The dialog is displayed when the "Dynakey Logic" Layout Menu selection is made. The dialog screen is similar to the icon dialog screen with a "→" marker pointing at the first ELL text line. In this case, the ELL text lines are "Dynakey 1" through "Dynakey 8" and the marker will point at the first text where the related dynakey label on the CRT 14 screen is non-blank. As with the icon dialog, a list box is used, but the list contains the ELL names that appear in the "keylogic.dat" file. The names are in alphabetical order. Above the list box is a box used for typing in an ELL selection. Each active dynakey will be assigned a ELL function for the case when data is entered and when it is not. The ELL default assignments are "A_Error_DataW" and "A_Error_DataWO" and the default data range is from 1 to 10 digits for the case of "with data". The use of default information means that ELL assignments are made even if this Layout Menu selection is not used. Now to explain the FIG. 6E flowchart.

Block 198 is executed first in FIG. 6E. The result is that the ELL dynakey dialog is displayed with the marker pointing at the first active dialog dynakey text, the corresponding ELL function name is highlighted in the list box, the dialog box above the list box contains the same highlighted name, and the data range dialog slots are filled with their current values. Continuing, block 200 is executed. If the result of the inquiry is "yes", then all the dynakey ELL dialog changes made thus far are discarded, and a branch is made to connector K in FIG. 6F. This flowchart is discussed after the current flowchart teaching is completed. Continuing, if the result of the inquiry at block 200 is "no", then block 202 is executed. If the result of this inquiry is "yes", then the current ELL function is to be modified and blocks 204 and 206 are executed. In block 204, the new name is typed in the dialog box above the list box just as the icon name was typed. Also, the data range slot values are modified as needed. Next, block 206 is executed and the new ELL name is placed in the dialog structure for the screen as an encoded number denoting the relative location of the function within the "keylogic.dat" file.

Refer again back to block 202. If the result of the inquiry is "no", then the "w/data" state is to be left as is and block 208 is executed. If the result of this inquiry is "yes", then block 210 is executed next. This also is where control is passed to after the current dynakey "w/data" state had its ELL modifications made. Continuing, in block 210 the "→" marker is rotated 180 degrees to become "←" indicating the "without data" state for the current dynakey. Also, the dialog contents are changed to reflect the ELL "without data" function and the data fields are made blank. Next, block 212 is executed. If the result of this inquiry is "yes", meaning the dynakey in its "without data" state is to be modified, then blocks 214 and 216 are executed. These are similar to blocks 204 and 206 except there is no data range information. Next, block 218 is executed. This block is also executed if the "without data" state is to be left unchanged meaning that the result of the inquiry at block 212 is "no". Continuing, block 218 is executed and the marker is changed back to "→" and moved to the next active dynakey dialog text. In short, this indicates the next "with data" dynakey state and again the dialog contents are modified to reflect this current information. However, should only one dynakey be active, then the marker remains at the current location. Once the marker is positioned correctly, then block 220 is executed. If the result of the inquiry is "no", then more dialog changes are to be made or the dialog changes are to be discarded. Hence, a branch is made back to block 200. If the result of the inquiry is "yes", then the dialog changes are kept and block 222 is executed. Here, all the ELL dynakey modifications are used to modify the screen's temporary structure. Then, a branch is made to K in FIG. 6F to continue the Layout Menu work. This flowchart is discussed next.

Refer again back to block 208 in FIG. 6E. If the result of the inquiry is "no", then the current "with data" state remains, and block 220 is executed to see whether more dialog changes are to be made or not. Block 220 has already been discussed, so this completes the FIG. 6E flowchart teaching.

Figure 6F:
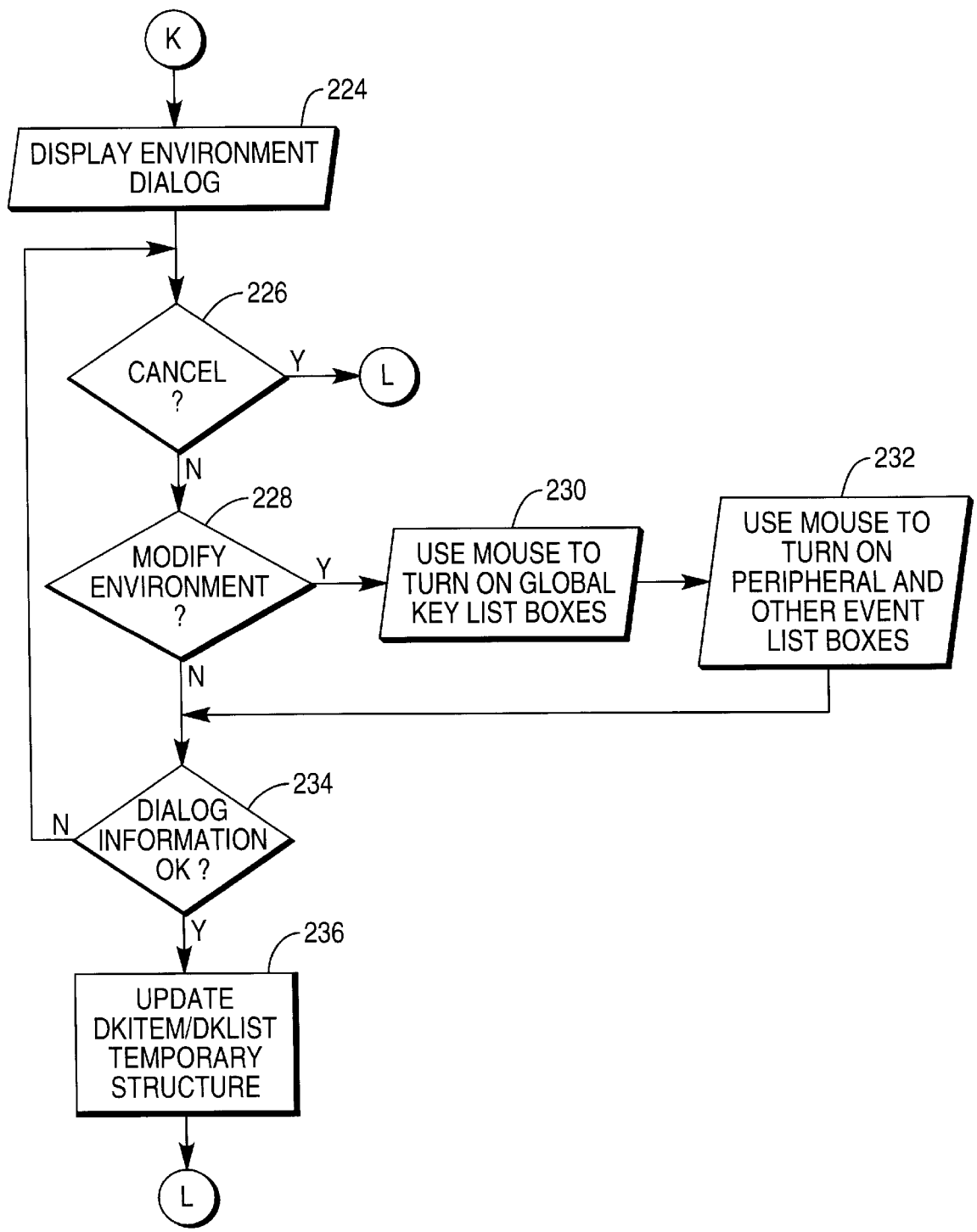

The FIG. 6F flowchart is invoked when the "Environment" Layout Menu selection is made and the associated dialog is placed on top of the current CRT 14 screen. The first purpose of the dialog is to allow for the mouse to be clicked on the list boxes to the immediate left of the global key labels. The labels of course are variable and come from the ".key" file. They are arranged in a 3 by 5 matrix just like on the DynaKey™ with the last two rows having the first two entries blank. If one of the dialog list boxes is checked, then the corresponding global key can be pressed in <R> to cause control to be to the first screen of the screen subset. If a global key dialog list box is not checked, then in <R> a beep occurs when that global key is depressed. The second purpose of the dialog is to use a list box to indicate which non-dynakeys besides the <Enter> key can be used for the screen. These include peripherals such as the scanner but there are other logical entities as well. These are explained when the <R> flowchart is discussed.

Refer now to the first block in the FIG. 6F flowchart. When block 224 is executed the environment dialog is displayed on the CRT 14. Next, block 226 is executed. If the result of the inquiry is "yes", then the environment dialog changes are discarded, and a branch is made to connector L in FIG. 6G. This flowchart, which corresponds to another Layout Menu selection, is explained after the current one.

Refer now back to block 226. If the result of the inquiry is "no", then block 228 is executed. If the result of this inquiry is "yes", then blocks 230 and 232 are executed. The execution of block 230 is implemented by having the mouse turn on or turn off the various global key list boxes. The execution of block 232 is similar except the mouse is used to turn on or off the list boxes denoting whether various peripheral and other logical events can be used with the current screen. If the result of block 228's inquiry is "no" then blocks 230 and 232 are bypassed. Next, block 234 is executed. If the result of the inquiry is "no", then more dialog changes are to be made or the dialog changes are to be discarded. Hence, a branch is made back to block 226. If the result of the inquiry is "yes", then the environment changes are to be retained and block 236 is executed. This results in the dialog changes being merged with the temporary structure that houses the entire screen's data that can be merged with the permanent structure after the last Layout Menu dialog is completed. This concludes the FIG. 6F flowchart teaching.

Figure 6G:
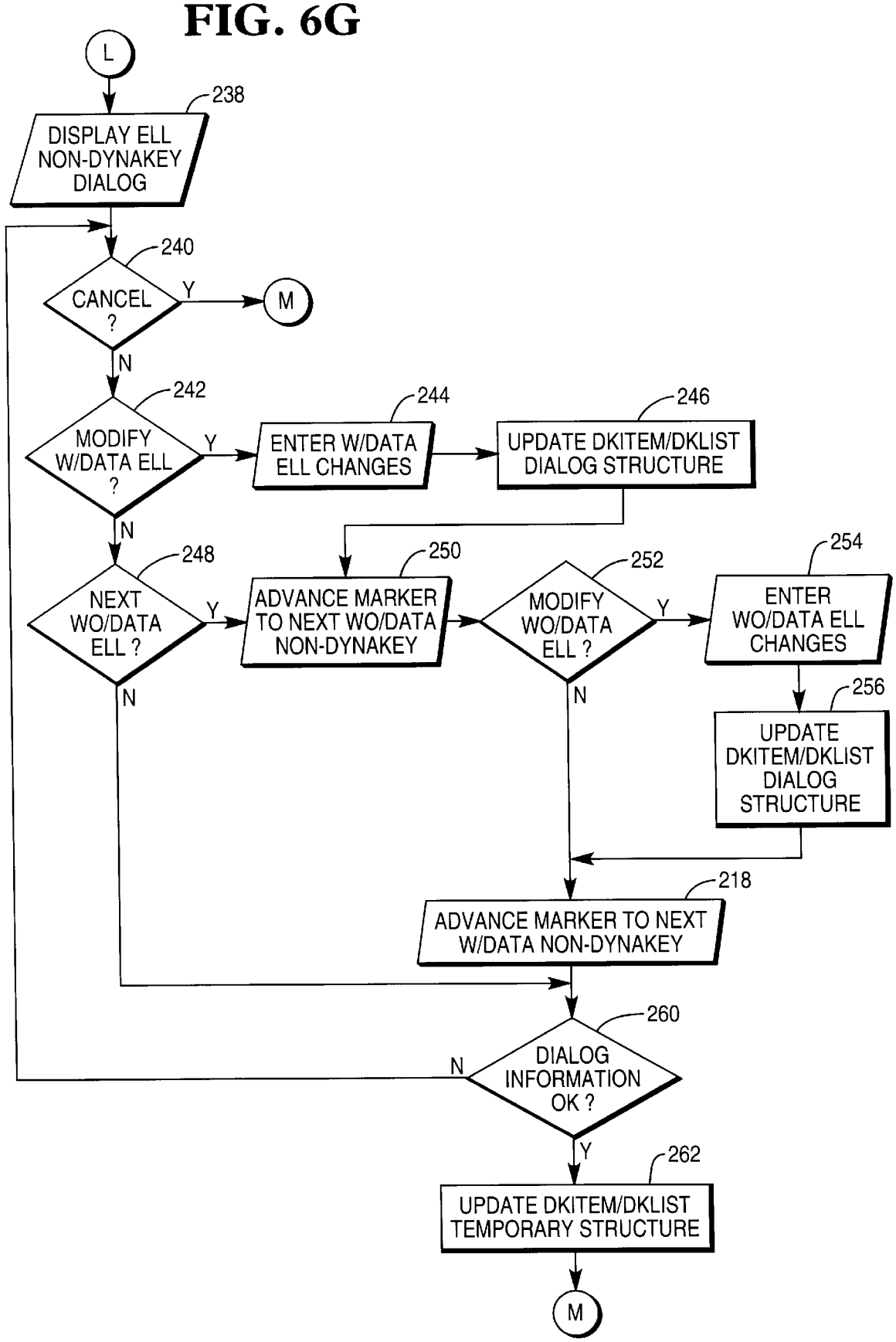

The FIG. 6G flowchart corresponds to the selection of the fifth Layout Menu. It is very important that first the fourth Layout Menu (Environment) be completed properly to insure that the other ELL functions can be assigned to the peripherals and other logical entities listed on the environment dialog. The reason is that the ELL marker will only move to those non-dynakey logical entities whose list box is checked on the environment dialog. The only exception is that the <Enter> key can always be assigned an ELL function.

Refer now to FIG. 6G. Notice that the flowchart looks very similar to the FIG. 6E except the ELL function work is done for non-dynakeys. Therefore, this flowchart is self-explanatory once the FIG. 6E flowchart is understood. And so, this concludes the FIG. 6G flowchart teaching.

The FIG. 6H flowchart corresponds to the selection of the sixth Layout Menu and is used for assigning global branching to any of the active dynakeys, the <Enter> key, the peripherals that can be accessed, and certain other event-driven entities that are explained later when the <R> flowchart is described. Therefore, it is imperative that prior to selecting this menu item the "Environment" selection's dialog be filled in correctly.

Reviewing, a global branch is when a branch is made to the first screen of another screen set. The technique that is used to enable global branching is one borrowed from the field of Artificial Intelligence and it involves using a "blackboard". Again, this is explained later when the <R> flowchart is discussed. Now to consider the FIG. 6H flowchart.

Figure 6H:
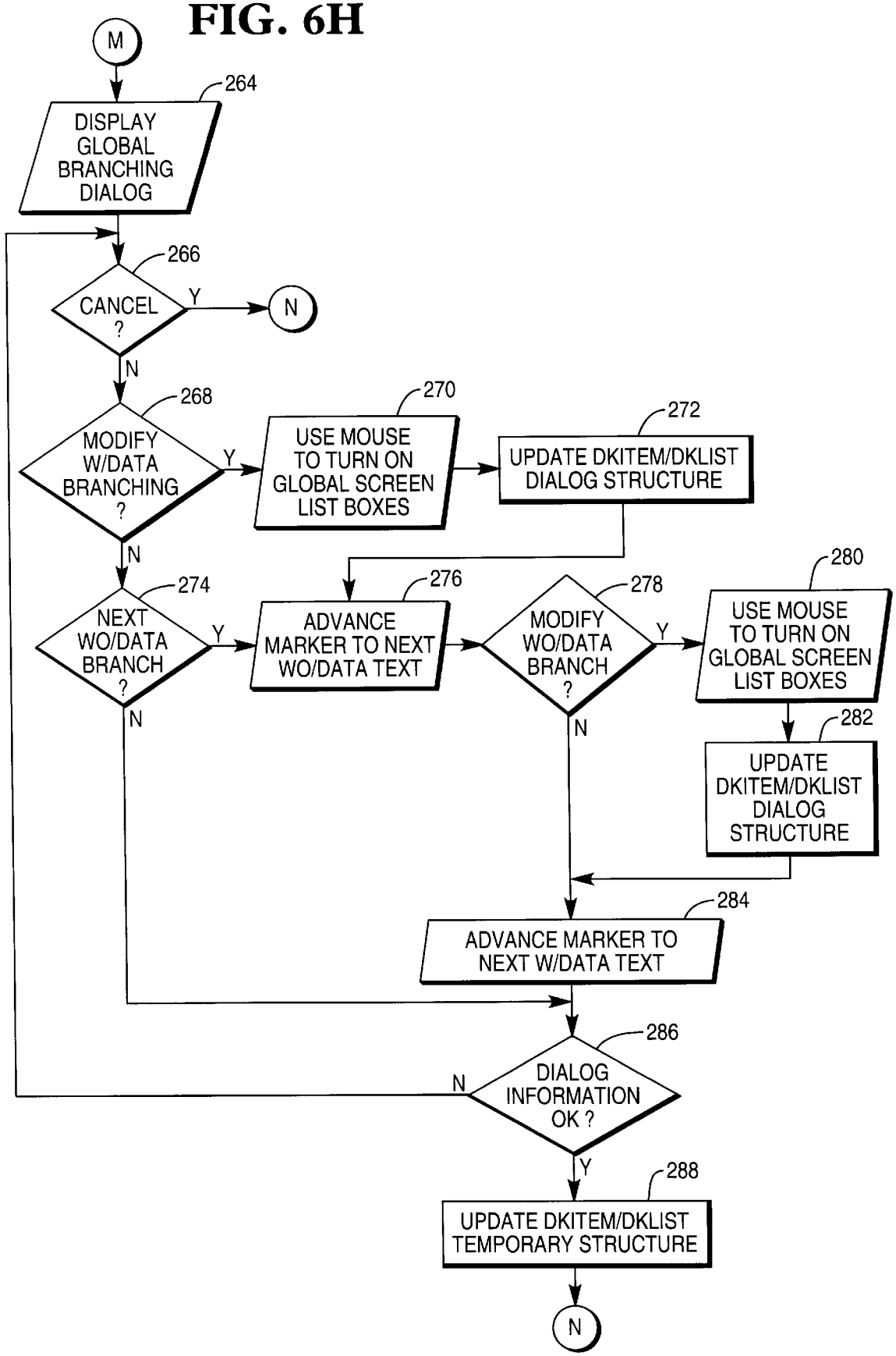

Block 264 is executed first in FIG. 6H and a global screen branching dialog is displayed on the CRT 14. The "→" marker points at the first text that corresponds to the entity that can have an ELL function assigned. Usually, this will be one of the "Dynakey 1" through "Dynakey 8" texts. If not, then it is the "<Enter>" text. In addition, in the dialog column is the text string "Scanner" along with several others. Importantly, the marker can never be moved to any text that is not eligible to have an ELL function. Continuing, block 266 is executed. If the result of the inquiry is "yes", then all of the global branching dialog changes are discarded and a branch is made to connector N in FIG. 6I. This flowchart, which corresponds to the last Layout Menu selection, is explained next. Continuing, if the result of the inquiry at block 266 is "no", then block 268 is executed. If the result of the inquiry is "yes", then global or "blackboard" branching is to be done for the current "with data" state. Therefore, blocks 270 and 272 are executed next. In block 270, the mouse is used to select all "blackboard" screen set names that can be branched to given different <R> program contexts. The selection process involves using a list box to select which of the list of "blackboard" screen names are to be assigned. Recall that one of the fields within the ".key" file identified the set name as being one that could be used in global branching. Since the global branching dialog is hard-coded with the "blackboard" names, these names can be placed within the dialog by using a utility program in advance of compiling <B> that reads and uses the ".key" file information. Continuing, once the "blackboard" screen names are selected, block 272 is executed. The implementation of block 272 is to use a "Select" dialog button that is pressed after the global screen set selections are made. This finalizes the choice and updates the dialog structure for the screen.

Refer back to block 268. If the result of the inquiry is "no", then the "w/data" state is to be left as is and block 274 is executed. If the result of the inquiry is "yes", then block 276 is executed next. This also is where control is passed once the current "w/data" state has its global branching modified in blocks 270 and 272. Continuing, in block 276 the "→" marker is rotated 180 degrees to become "←" indicating the "without data" state for the same dynakey or other logical entity. Next, block 278 is executed. If the result of this inquiry is "yes", then the global branching for the "without data" state is to be modified and blocks 280 and 282 are executed just like was done in blocks 270 and 272. Next block 284 is executed. This block is also executed if the "without data" state is to be left unchanged, meaning the result of the inquiry at block 278 is "no". Continuing, after block 284 is executed the marker is changed back to "→" and advanced to the next text string, be it a dynakey or some other logical entity. Next, block 286 is executed. If the result of the inquiry is "no", then more dialog changes are to be made or the dialog changes are to be discarded. Hence, a branch is made back to block 266. If the result of the inquiry is "yes", then all the dialog changes are to be kept and block 288 is executed. Here, the global branching changes are used to modify the screen's temporary structure. Then, a branch is made to N in FIG. 6I to finish the work associated with the last Layout Menu selection. This flowchart is discussed once the entire FIG. 6H flowchart teaching is completed.

Refer again back to block 274 in FIG. 6H. If the result of the inquiry is "no", then the current "with data" state remains, and block 286 is executed to see whether more dialog changes are to be made or not. Block 286 has already been discussed, so this completes the FIG. 6H flowchart teaching.

Figure 6I:
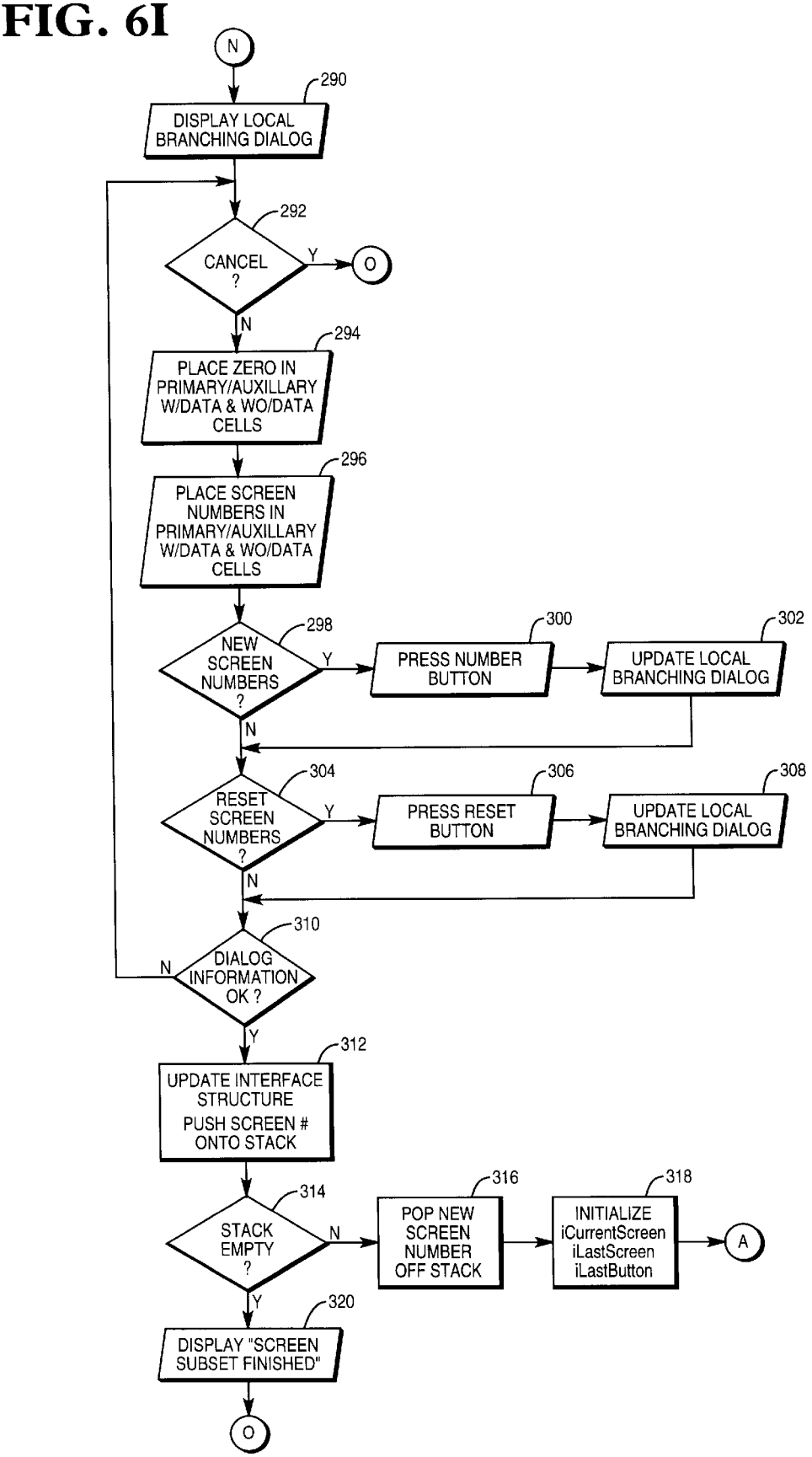

The last Layout Menu selection corresponds to the work done by the flowchart steps given in FIG. 6I. Block 290 is executed first and the local screen branching dialog for the screen is displayed on the CRT 14. The dialog includes two columns, one for primary local branching and one for auxiliary local branching. Within each column are two more columns for "without" and "with" branching in a spreadsheet type of format. Within each cell is a screen value. If the cell is not applicable because the logical entity is not used, then the cell contents are "NA". If the cell is applicable, and a screen number has already been assigned, then that number is placed in the cell. Otherwise, another value is placed in the cell and this will be discussed shortly.

Continuing, block 292 is executed. If the result of the inquiry is "no", then the dialog is exited and the temporary structure is left as is. Next, a branch is made to O in FIG. 6J to decide what to do next. This allows for a variety of eventual options including saving the file, terminating the program, or even using the seven Layout Menus again for the same screen. Continuing, if the result of the inquiry at block 292 is "no", then block 294 is executed. Here the dialog editor is used to place a zero in some of the primary and auxiliary cells that appear on the dialog. The reason this is necessary is in some cases all the branching is global and no screen within the local set is to be branched to. Also, in some cases the "with" or "without" data state is an error state and the placing of a zero for the branch denotes this situation.

Next, block 296 is executed. Again, the dialog editor is used to change some of the dialog cells values. The reason for doing this is to modify each cell that is associated with a screen number that already exists or is the current screen being modified. Block 298 is then executed. If the result of the inquiry is "yes", then some new screen numbers are to be generated automatically and placed in any cell that was given the 9998 value initially. These values are assigned to each cell that is eligible for local branching and that is not currently associated with any screen number. Block 300 is executed next and the 9998 cell numbers are changed within the dialog structure with the first 9998 number replaced with the next highest screen number in the interface. The implementation of block 300 is to press a "Number" dialog button. Continuing, block 302 is executed and the dialog screen contents are changed to reflect the 9998 replacements.

Refer back to block 298. If the result of the inquiry is "no", then no new screen numbering is to be done and blocks 300 and 302 are bypassed and block 304 is executed directly instead of after the renumbering. If the result of the inquiry is "yes", then blocks 306 and 308 are executed to cause all the dialog current contents to be replaced with the dialog's initial contents. This is useful when mistakes are made and the easiest thing to do is to start over. Continuing, when block 306 is executed the "Reset" button on the dialog is pressed and the dialog structure contents are reset. Then, when block 308 is executed the dialog structure contents are used to change the dialog cell values to their initial values.

Refer back to block 304. If the result of the inquiry is "no", then no re-initialization is to be done and blocks 306 and 308 are bypassed and block 310 is executed directly. If the result of this inquiry is "no", then the dialog contents are to be canceled or modified further and a branch is made back to block 292. If the result of the inquiry is "yes", then the dialog contents are to be taken as is and block 312 is executed. The result is the interface structure is updated using the temporary structure and the current dialog structure. Then, all the new screen numbers within the dialog cells are pushed onto a stack to enforce the top-down structure order of new screen construction with the primary branching screens constructed first followed by the auxiliary branching screens. Each stack entry also includes the last screen number and last button number. Continuing, block 314 is executed. If the result of the inquiry is "no", then the stack is not empty and more screens are to be constructed. Therefore, blocks 316 and 318 are executed before a branch is made back to A in FIG. 6A to continue the steps involved in modifying a dummy DKItem/DKList screen. In block 316, the top new screen item in the stack is popped. Next, block 318 is executed and the three variables "iCurrentScreen", "iLastScreen", and "iLastButton" are given values associated with the item just popped off the stack.

If the result of the inquiry at block 314 is "yes", then the stack is empty and block 320 is executed. Here, a popup window appears on the CRT 14 with the message "Screen Subset Finished". Here, the user must click with the mouse on the OK button to continue. Next, a branch is made to connector O in FIG. 6J to decide what to do next. This flowchart is discussed shortly. This concludes the FIG. 6I teaching.

Figure 6J:
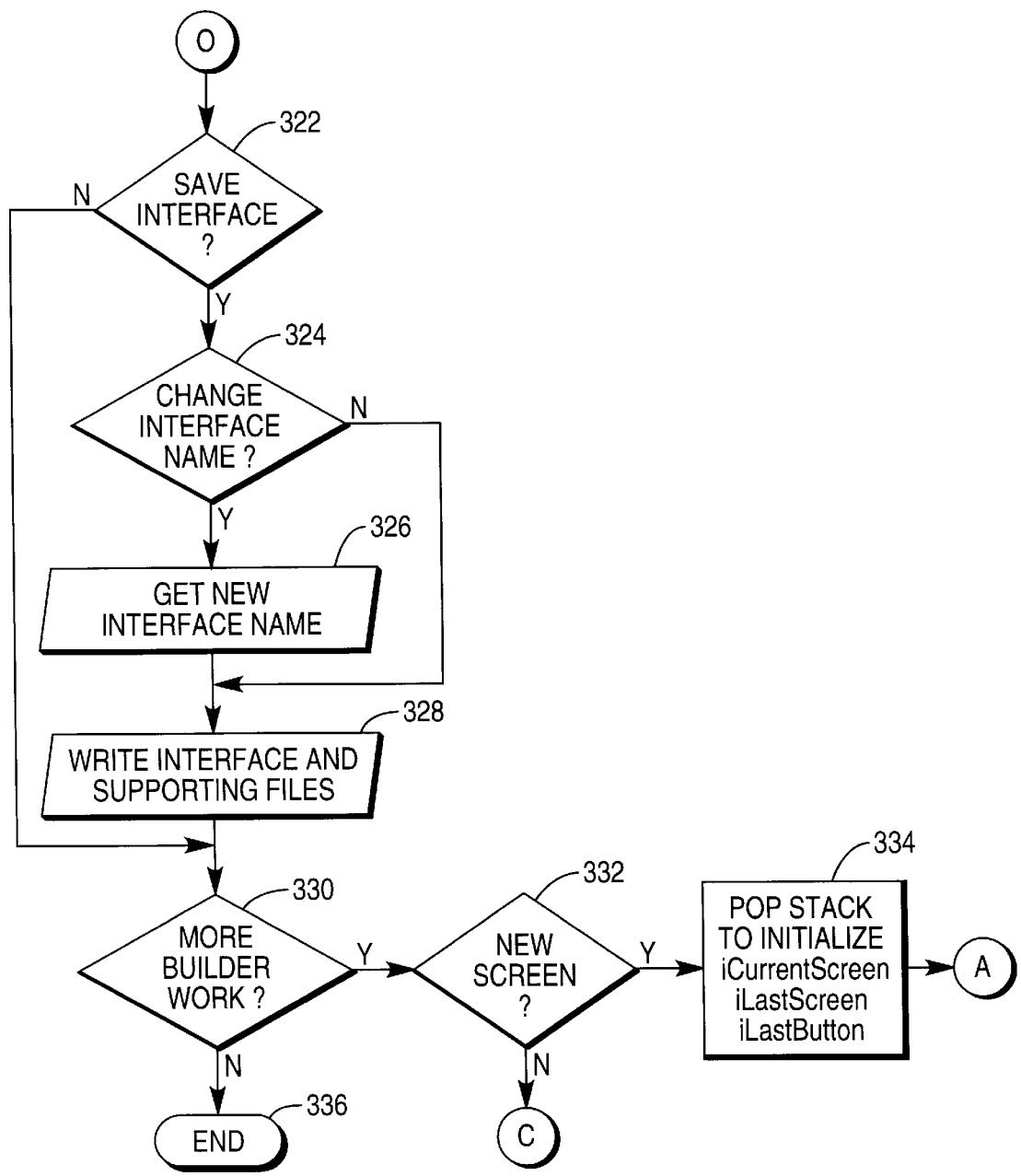

Before going on to the FIG. 6J flowchart, consider the effect of the seven Layout Menu items on the interface language. For example, consider again the "Sales Item Menu" shown in FIG. 2A. Next, look at the interface language for this screen shown in FIG. 3. Recall that the purpose for the first Layout Menu selection was for entering all the screen text. In this instance, the value of 29 in the first "1" record after the headings denotes the "Sales Item Menu" text code is 29. Also, the value of 30 in the same record is the text code for the first line of instruction which is "Scan, enter, or change item.". The next two instruction lines are blank so the code is zero. The last two text fields in the "1" record also have a value of zero because the "prompt" and "input" fields are blank in FIG. 2A. The rest of the screen text entered via the first Layout Menu is shown in the "2" records that pertain to active dynakeys. For example, in the first "2" record that follows the "1" record notice the text "2,1,31,0". The "2" indicates a dynakey, the "1" indicates the first dynakey", and the "31" and "0" values are associated with the two line label for the first dynakey. Notice, the second label is not used. Hence, the zero value. However, the value of "31" denotes that the text "Item Quantity" is the 31st record in the ".dat" interface file.

The second Layout Menu is used to select FIG. 2A's title icon and the five dynakey icons. Again, refer to FIG. 3 and notice the six corresponding names "BARCODE", "QUANTITY", "PRICECHG", "X", "X", and "LEFT" that were created in using the second Layout Menu. If no title icon is selected, then the text name would have been "NA" indicating not applicable.

The third Layout Menu is used to give FIG. 2A's five active dynakeys a "with" and "without" ELL function code and the input digit range for the "with" state. Again, refer to FIG. 3. Notice, in the first "2" record the string "148,1,10". The 148 denotes that the ELL function name for dynakey 1's "with" state is the 148th function in the "keylogic.dat" file. Next, the "1,10" information means the ELL function expects input to be from one to ten digits long. Refer now to FIG. 4. Notice, the 148th function assigned to dynakey 1 in its "with data" is identified to be "Item_Change_QuantityW" (411). The "2" record headings 302 in FIG. 3 and the FIG. 4 information can be used to locate the rest of the dynakey ELL assignments and data ranges when applicable.

The fourth Layout Menu is used to assign the screen environment for the screen shown in FIG. 2. Notice, the language for the "3" record in FIG. 3 is a series of T's and F's separated by commas. Then, observe in the "3" record heading 303 that the "bKey11, bKey12, . . . , bKey33, bKey43, bKey53" captions refer to the eleven global dynakeys. Therefore, by examining the last eleven values in the "3" record and by looking at the ".key" file one can determine which global keys are available for the FIG. 2 screen. The first ten T's or F's in the "3" record indicate which peripherals and other logical entities can be used when the FIG. 2 screen is the current one. The details are explained later when the <R> flowchart teaching is given.

The fifth Layout Menu selection functions very much like the third Layout Menu for FIG. 2 except the ELL function code and data range assignments are for the <Enter> key and the "Environment" logical entities, such as the scanner peripheral. To illustrate, notice in FIG. 3 the first "4" record is for the "<Enter>" key and the second is for the scanner. Referring to the "iFunctionW", "iLowW", and "iHighW" headings 304 in FIG. 3 notice the "<Enter>" key's pertinent "with data" ELL assignment is "150,1,10". Then, by consulting FIG. 4 again the 150th ELL function in the "keylogic.dat" file is found to be "Item_EntryW" 412.

The sixth Layout Menu is used to assign FIG. 2A's global branching. To illustrate, refer again to the last "4" record in FIG. 3. Notice, the number 1109 which is the "usBlackboardW" field value. The field is an unsigned 16-bit number as its name implies. Now refer to FIG. 4. Notice, that the scanner in its "with data" state for FIG. 2 has a branch to "**". Then, in FIG. 4's footing line the branch is defined to be to four different "blackboard" set names 413. The relative position of each checked name in the list of <B>'s global branching dialog names results in the corresponding bits in this 16-bit unsigned field being set to one. Also, the field value of 1109 is displayed in hexadecimal notation. Observe now, that <B> does not necessarily know the screen number that will be branched to when this assignment is made. The unraveling of the global branching abstraction is explained later when the <R> flowchart teaching is presented.

The seventh, and last, Layout Menu inserts local branching information into the interface language. For example, in FIG. 3 each "2" record and each "4" record has local branching. To see this, look at the first "2" record and consider the text "148,1,10,6". In review, for dynakey 1 the 148th ELL function expects the input range to be from 1 to ten symbols. Then, the 6 indicates the next screen number to be branched to once the ELL function completes successfully. In this case, for the FIG. 2 screen if a highlighted item has its quantity changed by first typing the new quantity and then depressing dynakey 1, the effect is that the receipt area is changed, but the subsequent branching is to the same screen. By considering the FIG. 3 headings, FIG. 2, and FIG. 4, the rest of the local branching incorporated into FIG. 3 should be understood. Now to continue with the FIG. 6J flowchart teaching.

Figure 6K:
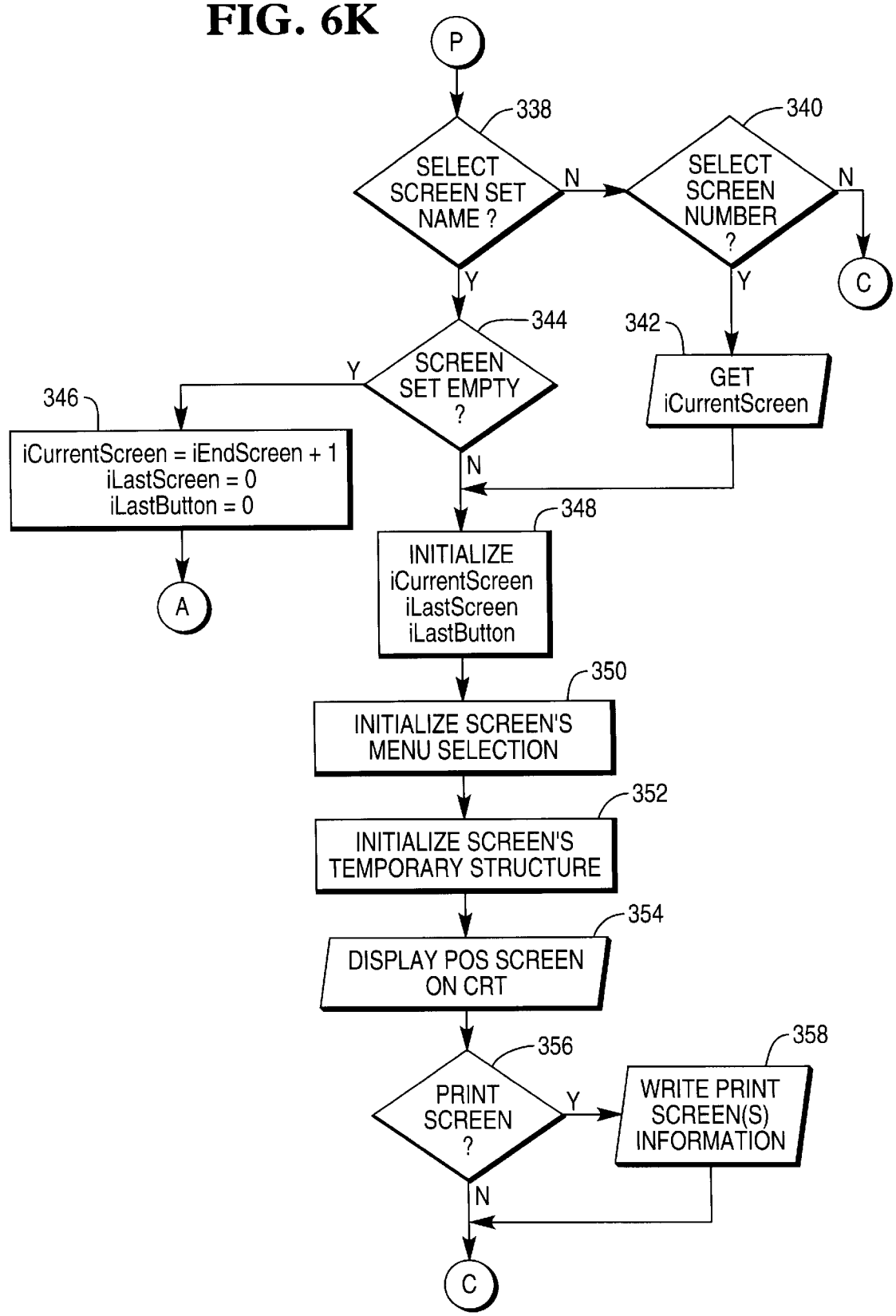
Figure 6L:
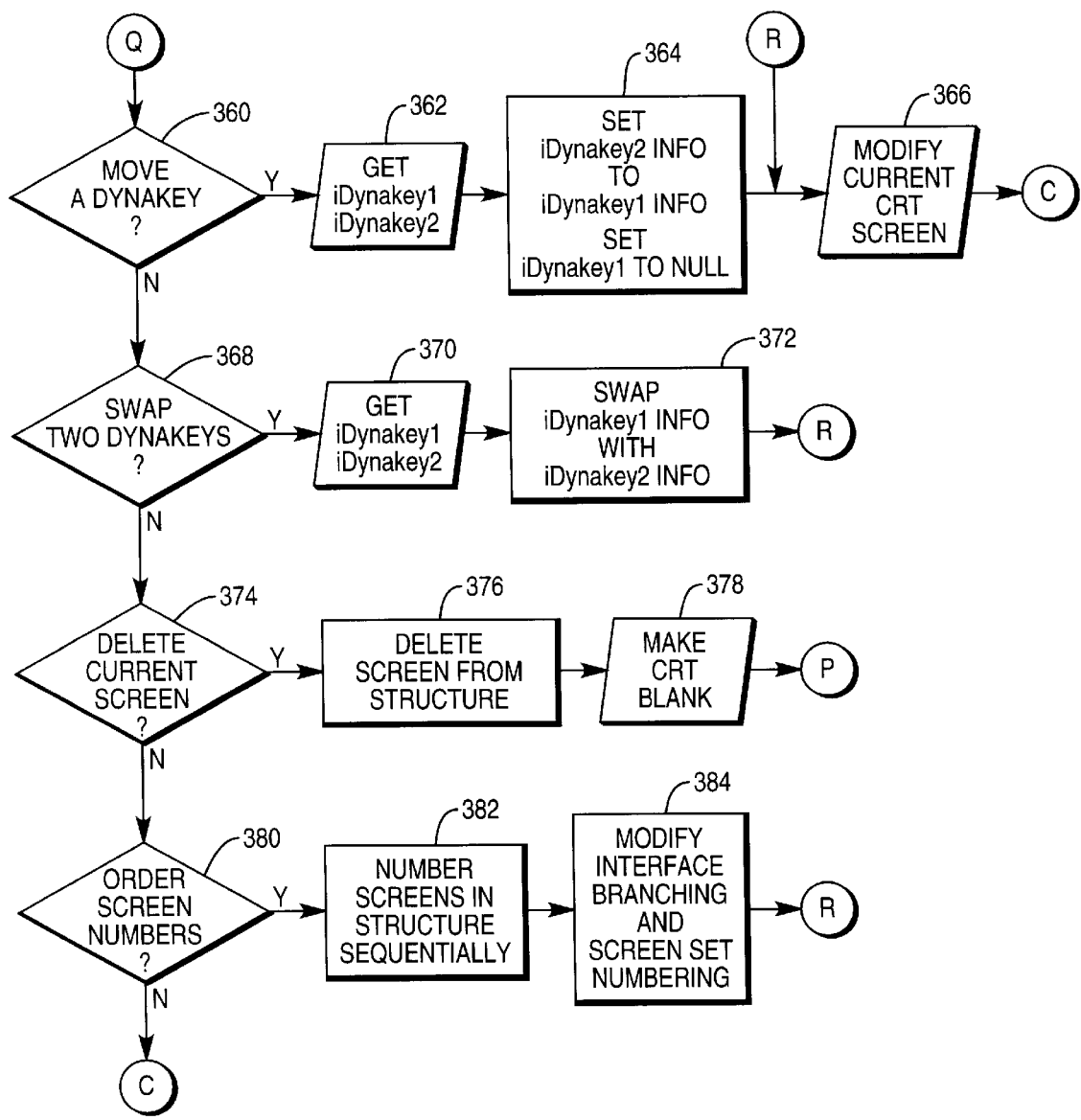

The primary purpose of the FIG. 6J flowchart is to allow for saving the interface and to decide what to do next in <B>. Therefore, connector C in FIG. 6J is reached after the 7 Layout Menu items have been used to create or modify an existing screen, or when other modifications are completed, or if the interface file is to be saved. Continuing, when a branch is made to 0, then block 322 is executed. Here, an inquiry is made to see if the interface is to be saved. The save can be implemented by adding the "Save" and "SaveAs" menu items to the File Menu. If the result of the inquiry at block 322 is "no", then the save logic is bypassed and a branch is made to block 330. More about this block later. If the result of the inquiry at block 322 is "yes", then block 324 is executed and the user decides whether or not to change the interface name. If the result of the inquiry is "yes", then block 326 is executed and a dialog is used to obtain the new interface prefix before block 328 is executed. If the result of the inquiry at block 324 is "no", then block 326 is skipped and a branch is made directly to block 328. The execution of block 328 causes the five interface files to be written to disk using the existing or new interface prefix name. Next, block 330 is executed and the inquiry is whether or not to continue modifying the interface. If the result of the inquiry is "no", then block 336 is executed and <B> terminates. Block 336 is implemented by adding the "Exit" menu item to the File Menu. Continuing, if the result of the inquiry at block 330 is "yes", then block 332 is executed. If the result of this inquiry is "yes", then there are more new screens to be built. Therefore, block 334 is executed to initialize the three variables using the top screen stack item. Recall that these three variables appear on each new screen in the receipt area. Next, a branch is made back to A in FIG. 6A where the type of screen is stipulated and the dummy DKItem/DKList screen is displayed. If the result of the inquiry at block 332 is "no", then no new screens must be built and a branch is made back to C in FIG. 6A to continue the next screen modification. This concludes the FIG. 6J flowchart teaching and there are now two remaining <B> flowcharts: FIG. 6K and FIG. 6L.

Now for the specifics of flowchart FIG. 6K. Recall that a branch is made to connector P in FIG. 6K if the current CRT 14 display is to be changed. This was done to allow for other screen set construction or screen modifications to be done. Continuing, an inquiry is done at block 338. If the result of the inquiry is "no", then this means no screen set name is to be selected from the GOTO Menu. Next, an inquiry is done at block 340. If the result of this inquiry is also "no", then none of the GOTO Menu selections are to be used and a branch is made back to C in FIG. 6A. In short, this is an escape route if the user changes their mind about using the GOTO Menu.

Refer again back to block 340. If the result of the inquiry is "yes", then block 342 is executed. The implementation of block 340 is to have the user select the "Screen" selection from the GOTO Menu if the result of the inquiry is "yes". Continuing, when block 342 is executed a dialog is used to place in "iCurrentScreen" an existing screen number. Before continuing to block 348, refer back to the inquiry at block 338 to see the result of the other GOTO Menu selections. If the result of the inquiry is "yes", meaning a screen set name is selected from the GOTO Menu, then block 344 is executed. If the result of this inquiry is "yes", then the selected screen set has no screens and transfer is made to block 346 before a branch is made back to connector A in FIG. 6A to build another new screen. When block 346 is executed, the "iCurrentScreen" variable is given the value of the next screen number which is stored in the "iEndScreen+1" variable. Also, the variables "iLastScreen" and "iLastButton" are set to zero since their is no previous screen context. Now back to block 344. If the result of the inquiry is "no", then the first screen in the screen set exists and block 348 is executed next. Recall that this block is reached also after an existing screen number is typed following the "Screen" selection from the GOTO Menu.

Continuing, block 348 is executed and the existing screen structure information is used to initialize the three variables "iCurrentScreen", "iLastScreen", and "iLastButton". Next, blocks 350 and 352 are executed and the existing screen information is used to check the appropriate Screens Menu item, be it either DKItem or DKList. Also, the temporary structure for the screen is initialized. Block 354 is then executed and the CRT 14 is modified to reflect the current screen information. An inquiry is then done at block 356 to see if the screens in the current set or the current screen are to be printed or not. The implementation of this inquiry is done by adding a "Print" menu item to the File Menu. If the result of the inquiry is "yes", then block 358 is executed and the screen or screens are appended to a disk file which can be later printed using Microsoft® Word. At the start of <B>, this disk file is empty. Thus, by selecting a GOTO Menu set name, one at a time, one can write the entire interface to the disk file for subsequent printing. An example of how the final printout looks is found in FIG. 4. Here, the readable printout is for the screen shown in FIG. 2A. Continuing, a branch is then made to connector C in FIG. 6A to allow for more "printing" or screen modifications. The branch is also made to C if the result of the inquiry at block 356 is "no", meaning no printing is to be done. This concludes the FIG. 6K flowchart teaching.

The final flowchart for <B> is FIG. 6L. The connector Q that points at the first block in this flowchart is branched to from FIG. 6A when the inquiry for "Screen Maintenance Type2" is "yes". The implementation for the flowchart consists of the "Maintenance Menu" with the following selections. "Move Dynakey", "Swap Dynakey", "Delete Screen", and "Compress Screens". The first selection enables the current dynakey at the ith location to be moved to the jth location, where the jth dynakey is not currently being used. The second selection is similar except two existing dynakeys are logically interchanged. The third selection enables a screen to be deleted if it is currently not in use. The fourth and last selection causes the screen numbers to be renumbered beginning with the number one. Now to explain the flowchart steps in FIG. 6L.

An inquiry is done at block 360. If the result of the inquiry is "yes", meaning a dynamic dynakey is to be moved, then block 362 is executed. At block 362 a dialog is used to place integer values in the two variables "iDynakey1" and "iDynakey2". Next, block 364 is executed. The result is that the "iDynakey1" location in the current screen's structure is moved to the "iDynakey2" location. Then, at the "iDynakey1" location the information is set to NULL. Next, block 366 is executed and the current CRT 14 screen information is modified to show the dynakey movement. Notice, the block is pointed to by connector R, since a branch will be made here also after the two dynakeys are swapped. Continuing, after block 366 is executed, a branch is made back to C to allow for more modifications.

If the result of the inquiry at block 360 is "no", then block 368 is executed. If the result of this inquiry is "yes", then blocks 370 and 372 are used to swap two dynakeys. Then, a branch is made back to R to finalize the modification. Block 370 is similar to block 362 except the two variables refer to two dynakeys that are currently being used. Block 372 is similar to block 364 except the two dynakey structure are interchanged at the two locations.

If the result of the inquiry at block 368 is "no", then block 374 is executed. If the result of this inquiry is "yes", then the current screen is to be deleted. Therefore, at block 376 the interface structure is modified after first checking to see that the screen is not referenced by another screen or that it is not the first screen in a screen set that has more than one screen. Also, if the screen is the only screen in a particular screen set, then the ".key" information resident in a structure is updated to reflect the screen set is now empty. Continuing, block 378 is executed and the CRT 14 screen is modified to show no screen information. Then, a branch is made back to P in FIG. 6A to decide which screen set or screen is to be modified next. This flowchart has already been discussed.

If the result of the inquiry at blocks 360, 368, and 374 are each "no", then block 380 is executed. If the result of this inquiry is "yes", then the screen numbers are to be sequentially ordered beginning with the number one. Therefore, blocks 382 and 384 are executed before a branch is made to R. When block 382 is executed, the first screen number in the interface structure is made 1 and the subsequent screens numbers are renumbered accordingly. Then, block 384 is executed and the external interface branching and the screen numbers referenced in the ".key" structure are modified as needed.

If the result of the inquiries at blocks 360, 368, 374, and 380 are all "no", then the Maintenance Menu selections are bypassed and a branch is made back to C in FIG. 6A without doing any modifications. This just shows the concept of changing one's mind about a particular type of modification. This finishes the FIG. 6L teaching as well as the <B> teaching.

Before beginning the <T> teaching, some final remarks about the source material used for implementing <B>. First, information pertaining to the DKItem and DKList objects is given in the 1994 NCR publication entitled *NICE® Client, Programming Information for C, Release* 1.2. Similarly, information regarding the intricacies of constructing Windows menus, menu items, and dialogs is given in the 1992 book entitled *Programming Windows™ 3.1* by Charles Petzold.

The teaching of <T> now commences. Notice, in screen 500 of FIG. 5 that in the top half of the receipt area is the current screen number being tested and this number is 6. This corresponds to the same screen 201 shown in FIG. 2A. Also, the dynakey being tested is the first dynakey 211 and its two line label is "Item Quantity" where the second line of the label is blank. When the dynakey is pressed in its "without data" state, the screen branched to is screen number 7. This is the screen shown in FIG. 5. In the bottom half of this receipt area is the ELL function that is associated with the pressing of dynakey 1 on screen 6 and the ELL name is "Item_Change_QuantityWO" (502). Below this line in the receipt area is the screen number branched to when the ELL function completes (503). Now for the <T> flowchart teaching.

Referring to the flowchart of FIG. 7A through 7E, <T>'s execution starts at block 500 and continues to block 502. When block 502 is executed, the five interface files are opened and the one supporting file is opened, just as in <B> for an existing interface. This time, however, the interface prefix is assumed to be "autopos". The reason is that this interface will be the one used in <R>. Then, block 504 is executed and the files are read and stored in appropriate arrays or array of structures. Next, block 506 is executed and a blank DKItem is displayed on the CRT 14. This facilities later displaying DKItem/DKList interface screens on top of the blank DKItem screen and gives a better look-and-feel to <T>.

Continuing, a loop is executed in blocks 508 through 514. The purpose of the loop is to set the elements of a boolean array to FALSE. This indicates that none of the current interface screens have been tested with respect to the ELL functions associated with each screen. After the loop completes, a branch is made to connector A in FIG. 7B. This concludes the FIG. 7A flowchart teaching.

Figure 7B:
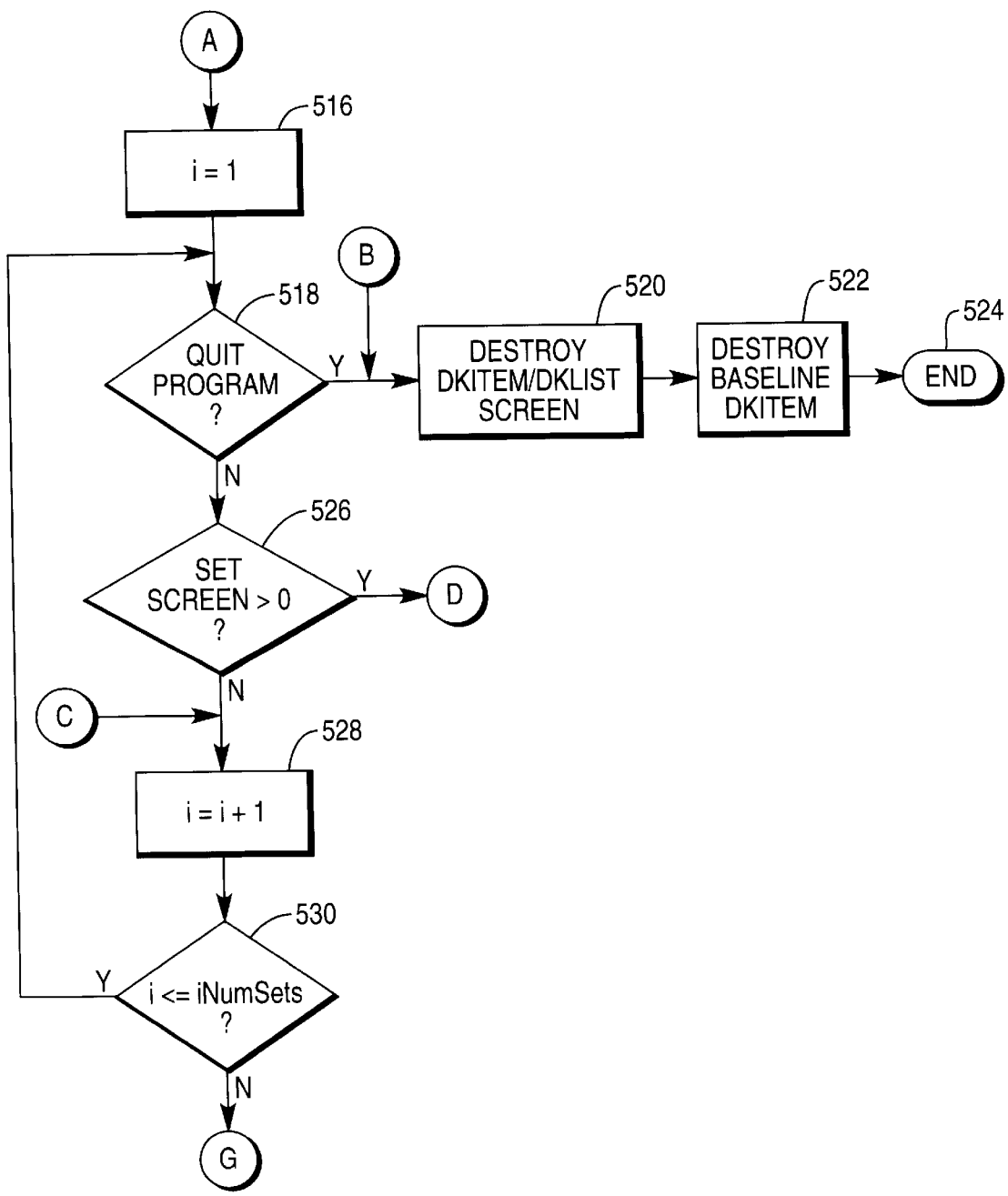

The purpose of the FIG. 7B flowchart is to provide another loop that is used to step through the screen sets, one at a time. Also, before any screens of a screen set are examined, the program can be terminated. Furthermore, if a screen set has one or more screens, then a branch is made to D in FIG. 7C where all the screens are tested. Continuing, block 516 is executed and the loop variable "i" is initialized to 1. Block 518 is executed next. If the result of the inquiry is "yes", meaning the program is to be terminated, then blocks 520 through 524 are executed. The implementation of block 518 is done by processing an event corresponding to pressing one of the digit keys. Elsewhere in <T> the program can be terminated, so block 520 is pointed to by the connector B. When block 520 is executed, the current DKItem or DKList screen is destroyed. Next, block 522 is executed and the baseline DKItem screen is destroyed. Finally, block 524 is executed and <T> is terminated.

Refer back to block 518. If the result of the inquiry is "no", then block 526 is executed. If the result of this inquiry is "yes", meaning the current set has a screen, then a branch is made to D in the next flowchart. This flowchart is explained after the current one. If the result of the inquiry at block 526 is "no", then the current screen set is empty and block 528 is executed. This block is pointed to by connector C, since after a screen set is tested a branch back to this block is necessary to continue the screen set loop. Continuing, in block 528 the loop variable "i" is incremented by 1. Then, block 530 is executed. If the result of the inquiry is "yes", meaning there are more screens sets to test, then a branch is made back to block 518. If the result of the inquiry is "no", then a branch is made to G in FIG. 7E to perform the <T> wrap-up work. This flowchart is discussed later. This concludes the FIG. 7B flowchart teaching.

The purpose of the FIG. 7C flowchart is to give the steps necessary to begin testing a particular screen set. When a branch is made to D in FIG. 7C, block 532 is executed. The first screen of the screen set is displayed on the CRT 14. If the screen type is different than the previous one, then the current screen is destroyed and the new one is displayed. Otherwise, the screen contents are modified. Continuing, block 534 is executed. This results in the set name and the first screen number of the set appearing in the receipt area. Then, block 536 is executed and the screen's logical information is pushed onto the stack. Specifically, the "with" and "without" states for each active logical entity constitute two stack entries. The stack is populated in reverse order. That is, dynakey 1's information appears before dynakey 2's and dynakey 8's appears before the <Enter> key. For each active logical entity the "without" state appears before the "with" state.

Continuing, blocks 538 through 542 constitute a loop within the screen set testing. The loop is pointed to by connector E. This loop is encountered after each individual screen in the screen set is tested. When block 538 is executed, an inquiry is done to see whether <T> is to be terminated before the testing is finished. If the result of the inquiry is "yes", then a branch is made back to B in FIG. 7B to cause <T> to be terminated. This flowchart has already been discussed. If the result of the inquiry is "no", then block 540 is executed. If the result of this inquiry is "yes", then the program is to be paused. The implementation of this block is carried out by having the user press the space bar. Next, block 542 is executed. If the result of the inquiry is "no", then the program is left in the paused state, and a branch is made back to block 542. If the result of the inquiry is "yes", then the program is to be resumed and a branch is made back to the start of the loop at E to see what to do next. Here again, the space bar is used, but this time the program is no longer left in the paused state. In short, the space bar functions as a toggle switch with respect to the pausing and the restarting of <T>.

Refer back to block 540. If the result of the inquiry is "no", then testing is to proceed and a branch is made to connector F in FIG. 7D to carry out the steps involved in testing a particular screen. This flowchart is discussed next. This concludes the FIG. 7C flowchart teaching.

Figure 7D:
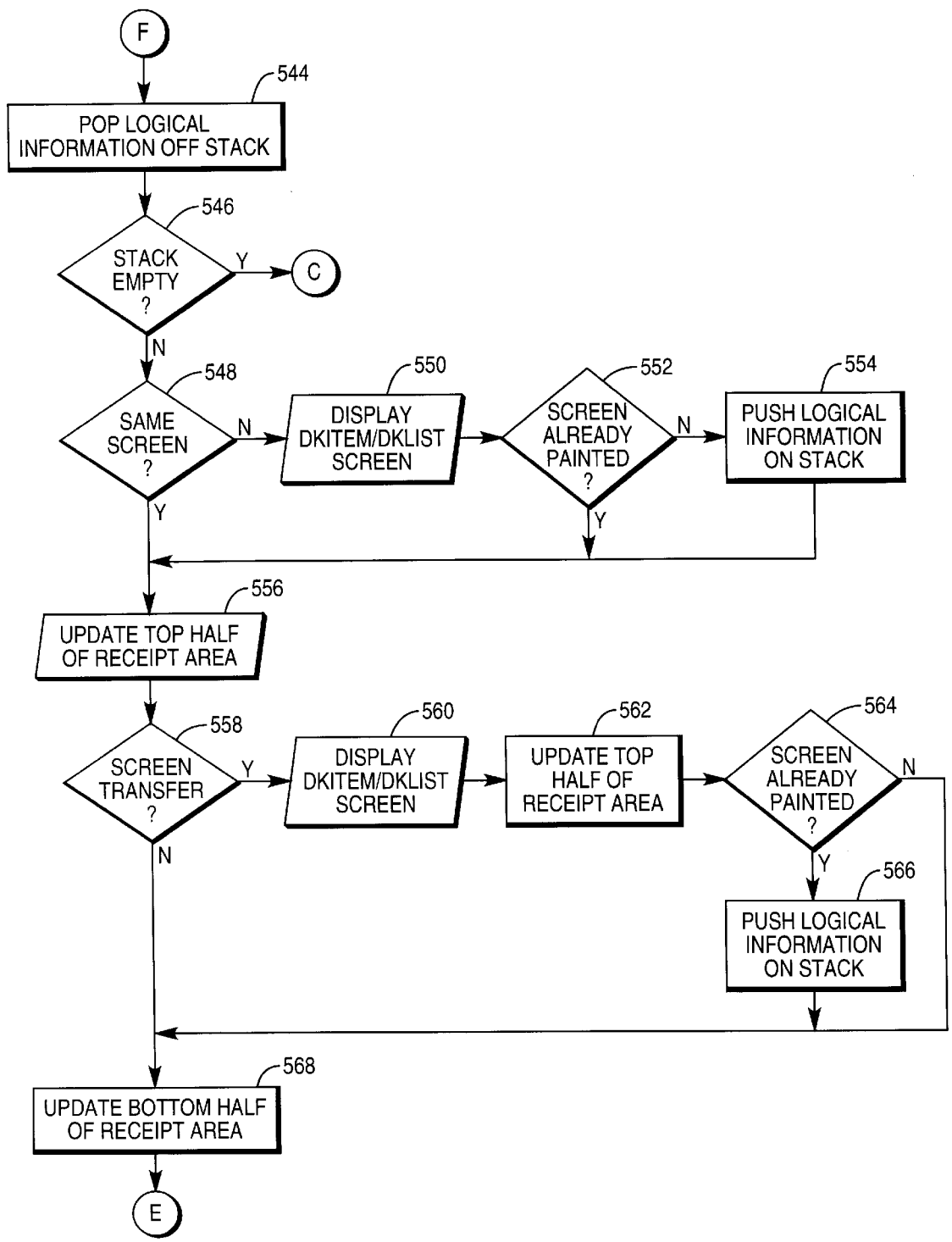

FIG. 7D is reached from FIG. 7C as just shown. Block 544 is executed first and the first ELL item is popped from the stack. Next, block 546 is executed. If the stack item popped is the empty set, then the current screen set has been tested and a branch is made back to connector C in FIG. 7B to continue the screen set testing loop. This has already been discussed. If the result of the inquiry at block 546 is "no", then block 548 is executed. If the result of this inquiry is "no", then the logical entity being tested is associated with a different screen than the current CRT 14 screen and blocks 550 through 554 are executed. When block 550 is executed, the screen associated with the logical entity being tested is displayed on the CRT 14. Next, block 552 is executed. If the result of the inquiry is "no", then block 554 is executed. This results in the new screen's logical information being pushed onto the stack. If the result of the inquiry at block 552 is "yes", then the screen is not to be re-tested again, so 554 is bypassed.

Refer back to block 548. If the result of the inquiry is "yes", then blocks 550 through 554 are bypassed because the current DKItem/DKList screen is the one now associated with a logical entity that is to be tested. Continuing, block 556 is executed. This causes the last ELL stack item popped to be used to place in the top half of the receipt area the information that is similar to that shown in FIG. 5. Next, block 558 is executed. If the result of the inquiry is "yes", then the tested ELL function results in a screen transfer. Therefore, blocks 560 through 566 are executed to show this testing path. When block 560 is executed, the branching screen is displayed on the CRT 14. Next, block 562 is executed and the top receipt information is again redisplayed. Then, block 564 is executed. If the result of the inquiry is "yes", then the current CRT 14 screen has not been displayed and its logical information is placed onto the stack. If the result of the inquiry is "no", then the screen has already been displayed and block 566 is bypassed.

Refer again to block 558. If the result of the inquiry is "no", then no branching takes place after the ELL function executes in <R>. Therefore, blocks 560 through 566 are bypassed. Next, block 568 is executed. This places in bottom half of the receipt area information that is similar to that shown in FIG. 5. In review, this information is the ELL function that is simulated and the screen branched to following the execution. After pausing a few seconds to allow the receipt information to be read, a branch is made back to E in FIG. 7C to either discontinue the testing, or to pause the tester, or to continue the testing using the stack. This concludes the FIG. 7D flowchart teaching.

Figure 7E:
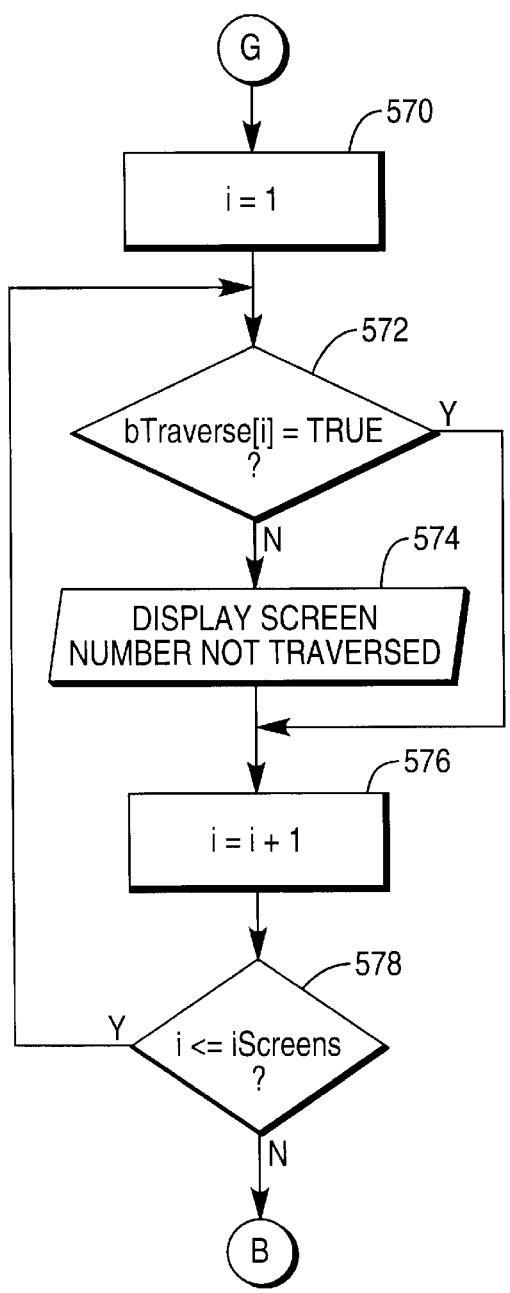

The final <T> flowchart is shown in FIG. 7E. Recall that this flowchart was branched to from the FIG. 7B flowchart and the branch to connector G occurs after all the screen sets have been tested. The primary purpose of the flowchart is to show the steps needed to display each screen number not tested in a popup window, one at a time, before a branch is made back to connector B in FIG. 7B to terminate the program. In this way, <B> can then be used, if desired, to renumber the screen numbers sequentially. Or it might be that some screens are not used anymore and <B> should be used delete these.

Continuing, block 570 is executed and the loop variable "i" is initialized to 1. Next, block 572 is executed. If the result of the inquiry is "no", then the ith screen has not been assessed by <T> and block 574 is executed. The effect of block 574 is to display in a popup window the screen number not encountered during the testing. The user then hits any input key to continue the testing. If the result of the inquiry at block 572 is "yes", then block 574 is bypassed. Next, block 576 is executed and the loop variable "i" is incremented by 1. Then, block 578 is executed. If the result of the inquiry is "yes", meaning the last element in "bTraverse" has not yet been checked, then a branch is made back to block 572. If the result of the inquiry is "no", then the loop is finished and a branch is made to B in FIG. 7B to terminate <T>.

A few final comments about <T>. If branching is to another screen set, then in the receipt area the set name appears but the local stack is not changed. Then, later the other screen set is tested. Also, besides the dynakeys and <Enter> key the various peripherals associated with the screen can have their logical information placed on the stack. Finally, if the "with" data state is tested, then the receipt area shows the range for the input with respect to the number of digits. This concludes the <T> teaching. Now, for the teaching of the interface integration into <R>.

Referring now to FIG. 8A through FIG. 8J, <R>'s execution starts at block 600 and continues to block 602 where a small, rectangular base window is displayed on the DynaKey™. Next, block 604 is executed and the base window is hidden. However, the base window is important because its handle is used to receive Window messages for the DynaKey™ 32 and its peripherals as <R> is executed. Continuing, block 606 is executed and the five "autopos" interface files are opened. This time, in contrast to what was done in <B> and <T>, the supporting file is not needed, so it is not opened. Next, block 608 is executed and the interface files are read and stored in arrays or array of structures. In addition, as the "autopos.key" file is read an integer "blackboard" array is filled with the beginning screen numbers for all the screen sets in the order the screen sets appear within the ".key" file. The term "blackboard" comes from the field of Artificial Intelligence and means in this case that the interface agent writes to an area that the <R> agent can later access. Therefore, this is what allows the interface language to be created and modified external to <R>. Another "blackboard" array is used to keep the beginning screen numbers for sets associated with global branching.

Continuing, block 610 is executed and a blank DKItem is displayed on the DynaKey™ 32. This is done to improve the look-and-feel as subsequent interface screens are destroyed and created. Next, block 612 is executed and <R>'s initialization work is performed. This includes doing the peripheral initialization work for the printer, scanner, MSR, and any other peripherals. Also, since many DynaKeys™ 32 may be hooked up to a single server, a LAN may be used to obtain the lane number and the particular register information. In addition, ".ini" files may be utilized to facilitate individual lanes using different scanners, etc. These files are processed using common Windows commands.

The last initialization step is completed when block 614 is executed. Here, the "autopos.1st" record is used to obtain the beginning screen number to be displayed. Once this number is known, then its array of structure information is used to display the proper DKItem or DKList screen. The screen text contents are obtained by using the interface numeric code information as an offset into the "autopos.dat" file. However, text fields can be variable and this presents a problem. For example, in the screen 231 of FIG. 2C, the tendering pound amounts 230 that serve as dynakey text labels are dependent on the items purchased. To handle the problem, specific mathematical composite functions are placed in <R>. The abstraction for each function is f of g defined to be f(g(x)). In other words, x is the numeric code, g(x) is the decoding string result using "autopos.dat", and f is the final decoding given the initial coding. For variable text, the initial decoding relies on the following abstraction. "::n:c". Here, "n" is an integer and "c" is a comment. In summary, if variable text exists for any screen text field, then <B> is used to enter the variable text abstraction where n is unique. This means the specific decoding logic must be given in <R> for the variable n. In many cases, however, this decoding logic is reusable in going from one <R> to another <R>.

Figure 8A:
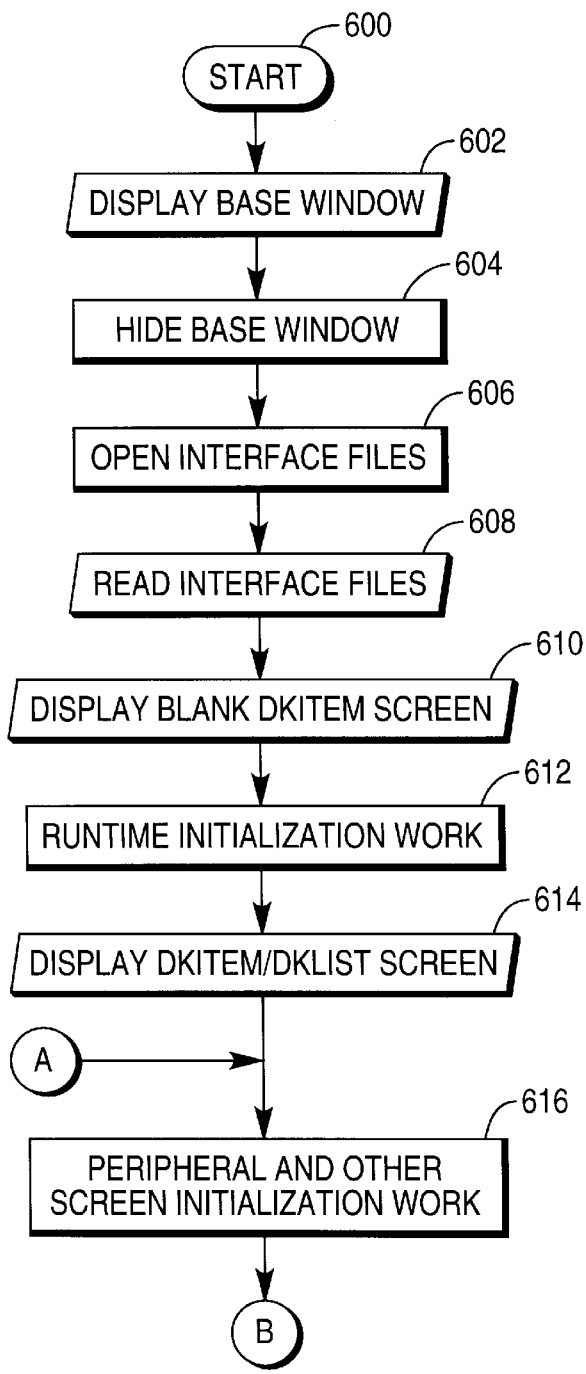

The next block in FIG. 8A, block 616, is pointed to by connector A. The connector is needed because once a different interface screen is displayed, then the peripheral and other screen initialization work must be done. For example, certain screens are associated with the scanner or other peripherals. Hence, the initialization for these devices must occur as the new screens are displayed. However, if the devices were active for the last screen, then the pertinent boolean variables already set to TRUE prevent device re-initialization. The other initialization work involves making any active dynakeys inactive based upon the receipt status and whether or not the associated ELL functions can be used. If the Dynakey™ 32 is a color LCD, then the inactive dynakey text is made red. Otherwise, the text is dimmed. The settings within the Windows control panel determine the actual effect. Continuing, other obvious variable initialization is done in block 616, such as setting the number of characters in the input buffer variable to zero. After block 616 is executed, a branch is made to connector B in FIG. 8B. This flowchart is explained next. This concludes the FIG. 8A flowchart teaching.

Figure 8B:
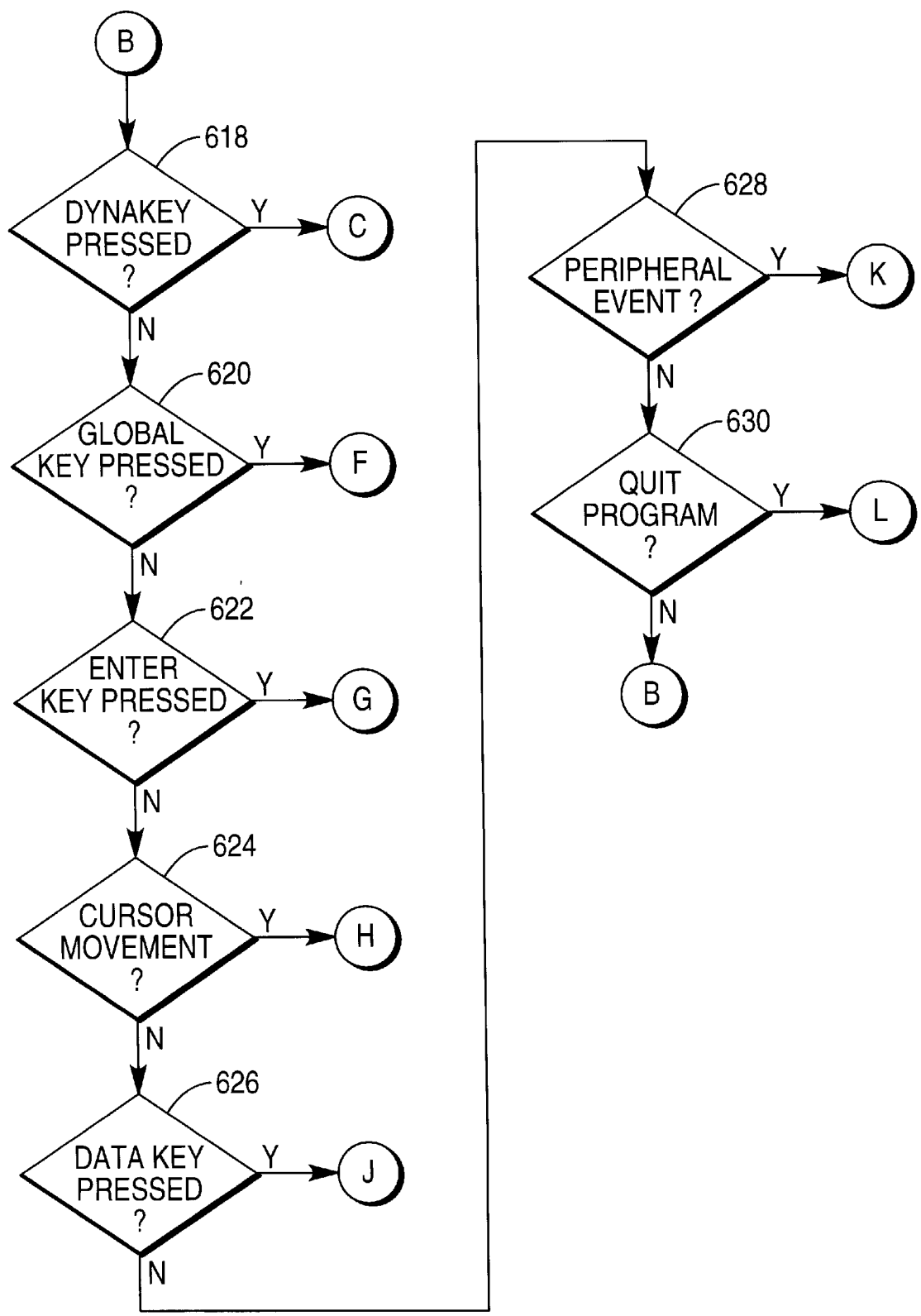

The purpose of the FIG. 8B flowchart is to process the runtime events within <R>. One implementation approach is to have within the event-handler function a series of case statements based upon the pertinent Window messages received. Or, a series of event-handler functions can be used. Continuing, when block 618 is executed an inquiry is done to see if any of the dynakeys associated with the current screen have been pressed. If the result of the inquiry is "yes", then a branch is made to connector C in FIG. 8C. This flowchart is discussed next.

If the result of block 618's inquiry is "no", then block 620 is executed. If the result of this inquiry is "yes", then a global key has been pressed. The detection is easy to implement since each global key is associated with a function code. However, since global keys are not labeled the same for all instances of <R>, the global matching code within <R> is not constant. To handle this variance, we know in the ".key" file we have the name of the "global" screen set, the corresponding function number, and the beginning screen number within the set. Therefore, a utility program can be written that modifies code kept in <R>. In short, the modification of a particular <R> is done once the global key determination is made and the utility program is run. Continuing, a branch is then made to connector F in FIG. 8E. This flowchart is discussed later.

If the result of the block 620's inquiry is no, then block 622 is executed. If the result of this inquiry is "yes", then the <Enter> key has been pressed and a branch is made to connector G in FIG. 8F. This flowchart is explained later. If the result of the inquiry is "no", then block 624 is executed. If the result of this inquiry is "yes", meaning one of the two cursor keys has been pressed, then a branch is made to connector H in FIG. 8G. This flowchart is explained later. If the result of block 624's inquiry is "no", then block 626 is executed. If the result of this inquiry is "yes", then a data key has been pressed and a branch is made to connector J in FIG. 8H. Again, this flowchart is explained later. Continuing, if the result of block 626's inquiry is "no", then block 628 is executed. If the result of this inquiry is "yes", then a peripheral event, such as a scanner read has occurred, and a branch is made to connector K in FIG. 8I. As before, this flowchart is explained later. Finally, if the result of all the non-termination inquiries in FIG. 8B are "no", then block 630 is executed. If the result of this inquiry is "yes", then a branch is made to connector L in FIG. 8J to perform the program termination steps. This flowchart is discussed last. If the result of the inquiry is "no", then a branch is made back to B in FIG. 8B. This just provides an escape route to the beginning of the event-handler logic and shows that events are not necessarily occurring at every CPU time-slice. This concludes the FIG. 8B flowchart teaching. We are now left with presenting the FIG. 8C through FIG. 8J flowcharts that show the steps involved for processing each type of runtime event. We begin with FIG. 8C.

Figure 8C:
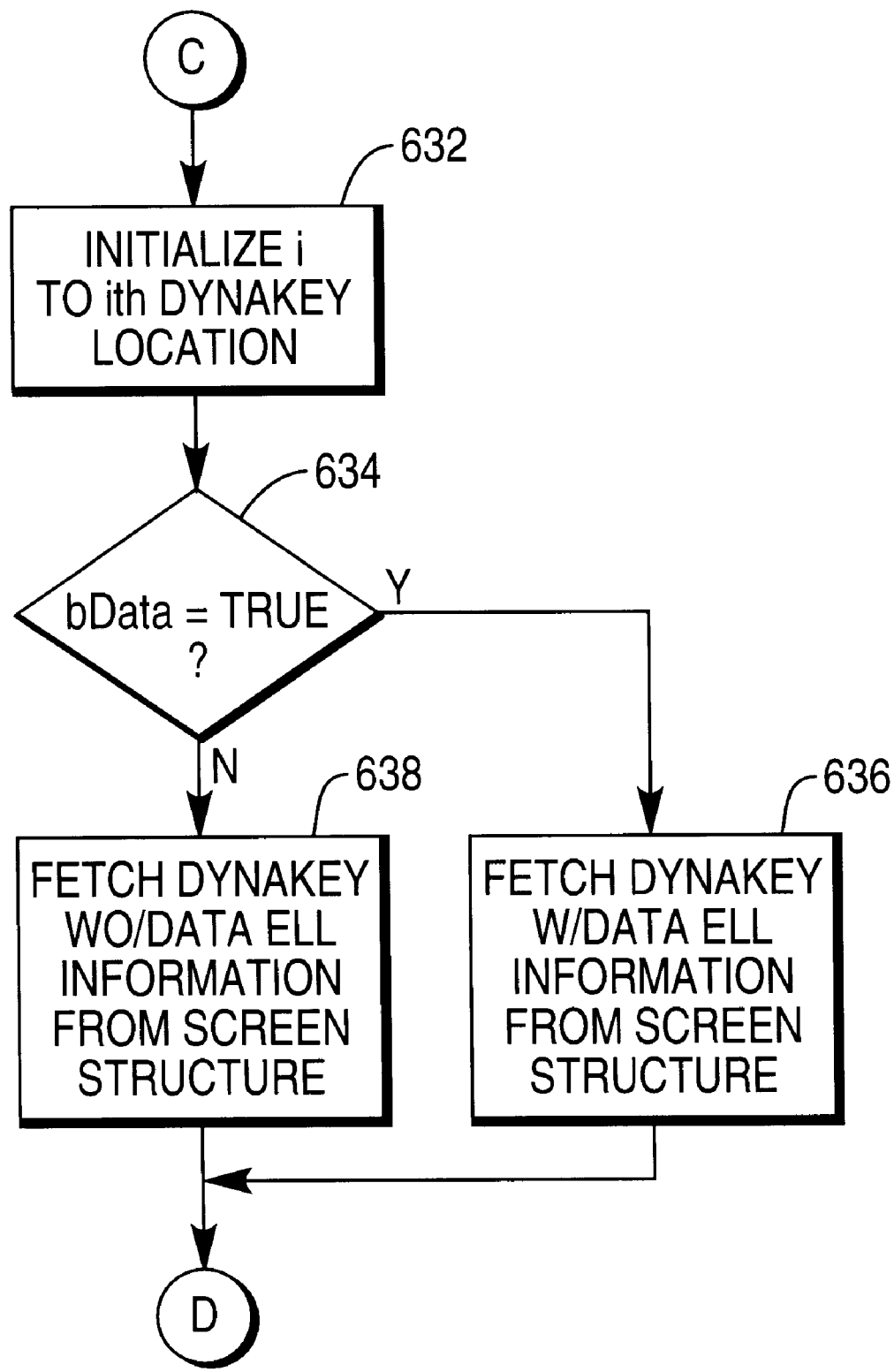

Recall that connector C in FIG. 8C is reached when a dynakey has been pressed. Continuing, block 632 is executed and the particular dynakey is identified and the variable "i" is given the proper value. This particular dynakey detection is easy to implement since the eight dynakeys always correspond to the function keys one through eight respectively. Also, if an inactive dynakey is pressed or one that has no label, then no Windows event occurs. In short, connector C is reached only for an active dynakey. Continuing, block 634 is executed. If the result of this inquiry is "yes", then some input has been entered prior to the dynakey being pressed, and block 636 is executed. Here the screen number and the variable "i" are used to fetch from the interface structure the ELL information for the ith dynakey in its "with data" state. The use of this information will become apparent shortly.

Refer back to block 634. If the result of the inquiry is "no", then block 638 is executed. This block is similar to block 636, except the "without data" state information is retrieved from the stored interface structure. Once block 638 or 636 are executed, then a branch is made to connector D in FIG. 8D to continue processing the ELL logic. This flowchart is presented next. This concludes the FIG. 8C flowchart teaching.

Figure 8D:
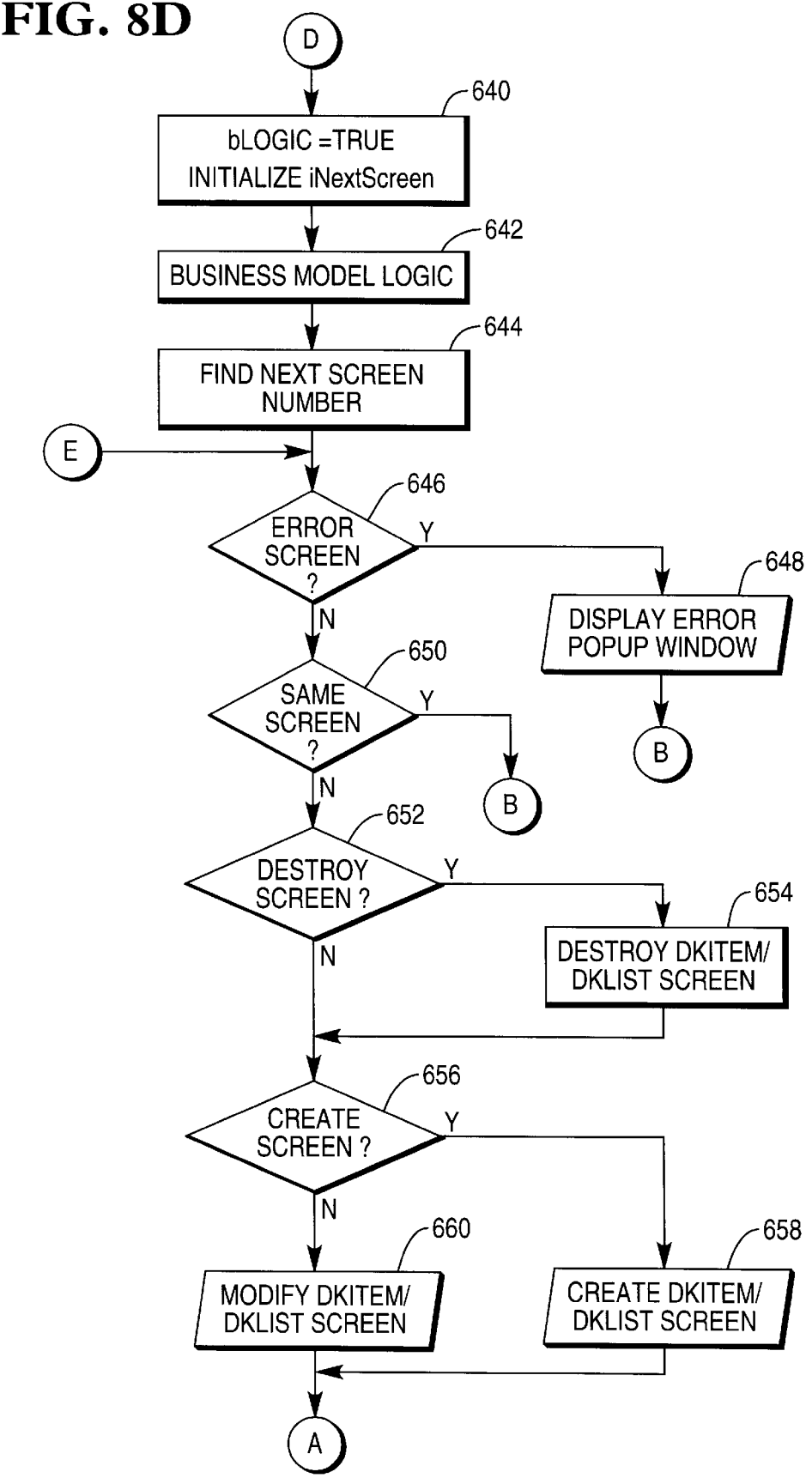

Connector D in FIG. 8D is reached after the ELL information is retrieved for a dynakey, <Enter> key, or some other logical event identified in <R>. Continuing, block 640 is executed and the "bLogic" variable is set to TRUE and the variable "iNextScreen" is given the primary local screen number value associated with the ELL information just retrieved. The use of these variables will become apparent as the teaching unfolds.

Next, block 642 is executed. Here, the ELL function work begins by calling the "Business_Model" function with the ELL relative number just obtained from the structure. The proper ELL function is then executed by using the following C line of code: "bStatus=Bridges[iFunction]( );" The reason the invocation works is that the ELL functions are coded in alphabetical order following the "Business_Model" function and because an ".h" file defines "Bridges" as follows: "int (*Bridges[NUM_FUNCTIONS]) (void)={. . . };". In the statement, NUM_FUNCTIONS is given a value via a "define" statement and the three dots are replaced with the ELL function names separated by commas. The generation of the ".h" file and the ".c" file is done automatically by using a program that uses the "keylogic.dat" file as input. Then, the skeleton ".c" file containing the ELL logic functions is modified as specific ELL code is added. As development takes place, the "keylogic.dat" file may be modified with new ELL functions and some of the existing ones can be deleted. To automate this process, the following sequence of steps are done. First, the new names are added to the end of the "keylogic.dat" file and a relative number of −1 is typed to the right of the name and the comma. Second, the relative number of those to be deleted is changed to −2. Then, the file is sorted in alphabetical order. Next, <B> is invoked and its files are saved. As a result, both the interface and the "keylogic.dat" files are updated. Third, a program is run that updates the ".h" and ".c" files to delete the old ELL functions and to add the skeleton new ELL functions. Finally, the new ELL functions are modified to reflect the business model.

After block 642 is executed, it is time to determine the next screen to be displayed. It may be the same screen or it may be another screen. Continuing, block 644 is executed and the variable "iNextScreen" is modified as needed. The reason that "iNextScreen" is possibly overridden is twofold. First, it may be that local branching is still needed, but that the auxiliary screen number is to be used and not the primary one. Therefore, "iNextScreen" is given the value for the auxiliary screen number if the ELL function has placed in a temporary variable a non-zero value. Second, the final task in block 644 is to place in "iNextScreen" the first screen number in another screen set should global branching be required. The assumption is that global branching is only applicable if <B> has been used to specify global branching for a particular dynakey, <Enter> key, or other logical screen entity and if <R> confirms this. For example, consider FIG. 2A again. Suppose the first receipt item, "ZIPLOCK" (203A), does not require any weighing after the item is scanned. On the other hand, suppose the second receipt item, "BANANAS" (203B), does require weighing. Then, the ELL function associated with the screen's scanning in its "with data" state must somehow distinguish between making the global branching active or inactive. This assumes that a global branch is made to the first screen in the "PLU WEIGH" set for "BANANAS" and a local branch is made to the FIG. 2A screen after scanning the "ZIPLOCK" item. The question, then, is how is global branching enforced? First, recall the teaching of <B> where each ELL assignment includes an unsigned variable. If the first global screen set is a possible branch for, say the screen's scanner it its "with data" state, then the least significant bit in the field is set to 1 and not 0. Likewise, for all the other screen sets and the respective bits in the unsigned number. For example, this is shown in FIG. 3. Here, the last "4" record 314 has an unsigned "usBlackboardW" field having the hexadecimal value of 1109. This global branching field is for the scanner in its "with data" state. Recapping, in block 644 the global branch determination begins by shifting the pertinent unsigned bits to the right, one-at-a-time. If any have a value of one, then a check is made to see if the corresponding boolean variable for that global set name has a value of TRUE. The boolean variable is set to TRUE in the ELL function that was just executed in the preceding block 642. This array of boolean variables is set to FALSE initially and after each new branch is determined. The boolean variable assignment statement uses the screen set name as an offset into the array. For example, in the ".key" file suppose the comma separated file has its two name fields populated with the following contents: "Item,Entry". These can be easily combined into one name consisting of upper case letters with an underscore character added to become "ITEM_ENTRY". Then, an ".h" file can be generated from the ".key" file that consists of "#defines", the upper case name, and a numeric value. In summary, after block 644 is executed the "iNextScreen" variable contains the next screen to branch to, be it the error screen number of zero, the same screen in the same set, a different screen in the same screen set, or the first screen in another set.

Next, block 646 is executed Notice, that the block is pointed to by connector E. The reason is that when a global key is detected, other than the <Clear> key, a branch will be made here once the first screen of the global screen set is known Continuing, if the result of block 646's inquiry is "yes", then the value of "iNextScreen" is zero, meaning an error has occurred. For example, in FIG. 2A, suppose no data is entered and the <Enter> key is pressed. An error state occurs, as shown in FIG. 4, where the ELL function is "A_Error_EnterWO" and the next screen number is zero (410). Continuing, block 648 is executed next and a popup window is displayed over the current DKItem/DKList screen. The contents include an error message indicating which "key" was pressed, in what state, and the screen number that could not be found. At this point all other subsequent runtime events are not processed until the global <Clear> key is pressed. One implementation is to process these runtime events based upon the TRUE value of a boolean guard variable. Continuing, a branch is made to connector B in FIG. 8B to await the <Clear> runtime event.

Refer back to block 646. Suppose the result of the inquiry is "no". Then, block 650 is executed. If the result of this inquiry is "yes", then the value in "iNextScreen" is the same value as the current screen number. Therefore, nothing more needs to be done after the current ELL function has completed, so a branch is made back to connector B as before. If the result of block 650's inquiry is "no", then block 652 is executed. If the result of this inquiry is "yes", then a DKItem/DKList screen is to be deleted.

The first case where screen deletion is required is if the current screen is a DKList screen and the next screen number is different. For example, suppose the DKList screen 221 of FIG. 2B is the current screen. When this type of screen is created, it is typically placed on top of a DKItem screen 201 like that shown in FIG. 2A. Then, the DKList screen has its dynakey labels (210) and functions predefined for the last six dynakeys. This is to allow for easily traversing the receipt list without any programming. The receipt list is usually populated from a file whose name can be given the DKList when it is created. Then, the first page of the file appears in the receipt area automatically. Each DKList screen is further customized by allowing the top two dynakeys and <Enter> key to be given ELL information by <B>. Once a list is processed, using one or more of the particular screen's ELL functions, then the DKList screen is always deleted. This usually leaves the DKItem screen as the current screen. Thus, the purpose of the DKList screen is to gather information that is stored in "blackboard" areas for later use. Usually, this information effects the receipt area in an existing DKItem screen that lies beneath the current DKList screen.

To illustrate the second case of screen deletion, suppose the current screen 261 is the one shown in FIG. 2F. Also, suppose that more than one DKItem screen exists, and the previous screen is the DKItem shown in FIG. 2A. To unravel this case, suppose FIG. 2A is created after the logon process. Then, assume the existence of a global key to obtain operator messages. If that global key is pressed, then the screen shown in FIG. 2F is placed on top of the screen shown in FIG. 2A. The means the "Sales Item Menu" screen is still available for use with a minimal amount of programming once the message screen is deleted. In particular, the handle for the "Sales Item Menu" must be retained along with an array that keeps the status of each of its active dynakeys. Generalizing, the two DKItems are different because <3>'s "Environment" dialog for each screen includes two boolean variables, one for suppressing subtotals and one for suppressing totals. For the FIG. 2A DKItem screen these are both checked when the screen is created by <B>. And for the FIG. 2F DKItem screen these list boxes are not checked. In summary, when block 652 is executed the inquiry will be "yes" if more than one DKItem screen exists and their two subtotal/total "Environment" boolean variable values are not the same. Then, block 654 is executed and the current screen being displayed is destroyed. This means the handle of the screen now exposed should become the current screen handle and its corresponding dynakey status array should become the active status array.

Refer again back to block 652. Suppose the result of the inquiry is "no". Then, block 656 is executed. This block is also executed after block 654 is executed. Continuing, if the result of block 656's inquiry is "yes", then block 658 is executed. Here, the "iNextScreen" number is used to retrieve from the interface stored in memory the designated DKItem or DKList screen. If the screen is a DKList a screen, then the previous ELL function copies the file name to a "blackboard" variable name that is used in the DKList creation. If the new screen is a DKItem screen, and the current screen is a DKItem screen, then the current DKItem handle must be saved in a stack along with the status of each of its dynakeys. For typical POS application, the number of active interface screens is usually no more than three.

Refer back to block 656. If the result of the inquiry is "no", then block 660 is executed and the current DKItem screen is modified using the screen number to fetch the information from the stored interface. This saves memory by only creating new screens when necessary. It also results in <R> running faster. After block 660 or 658 are executed, a branch is made to connector A in FIG. 8A to perform additional screen initialization such as peripheral enabling, etc. This block was discussed earlier. This concludes the FIG. 8D flowchart teaching.

Connector F in FIG. 8E is reached when a global key has been pressed and detected in FIG. 8E. Continuing, block 662 is executed. If the result of the inquiry is "no" then the <Clear> global key has not been pressed. Next, block 664 is executed and the global key's function number given in the ".key" file and beginning screen number are used to identify the global key and to find the first screen number in the its screen set. Next, a branch is made to connector E in FIG. 8D to perform the steps involved in displaying the screen. This flowchart segment has already been discussed.

Refer back to block 662 in FIG. 8E. If the result of the inquiry is "yes", then the <Clear> global key has been pressed. The identification of this key is easily determined by using the ".key" name and its associated function number key. Continuing, block 666 is executed. If the result of this inquiry is "yes", then <R> is in the error or information state and a popup window exists on the DynaKey™ with the last line telling the operator to press the <Clear> key. Therefore, block 668 is executed and the popup window is destroyed and the boolean guard for runtime events is again set to TRUE to allow for more runtime events. Finally, a branch is made to connector B in FIG. 8B to process more runtime events.

Refer back to block 666. If the result of the inquiry is "no", then the <Clear> global key has been pressed but <R> is not in an error or information state. Hence, block 670 is executed. This re-initializes the variables associated with input. That is, "iData" is set to zero and the input buffer areas are set to NULL. Next, block 672 is executed and the input area on the current screen is erased to allow for more input to be entered. Usually, these flowchart steps are needed when the input contents are incorrect and the input needs to be re-entered. After the screen input is erased, then a branch is made back to connector B in FIG. 8B to await more runtime events. This concludes the FIG. 8E flowchart teaching.

Figure 8F:
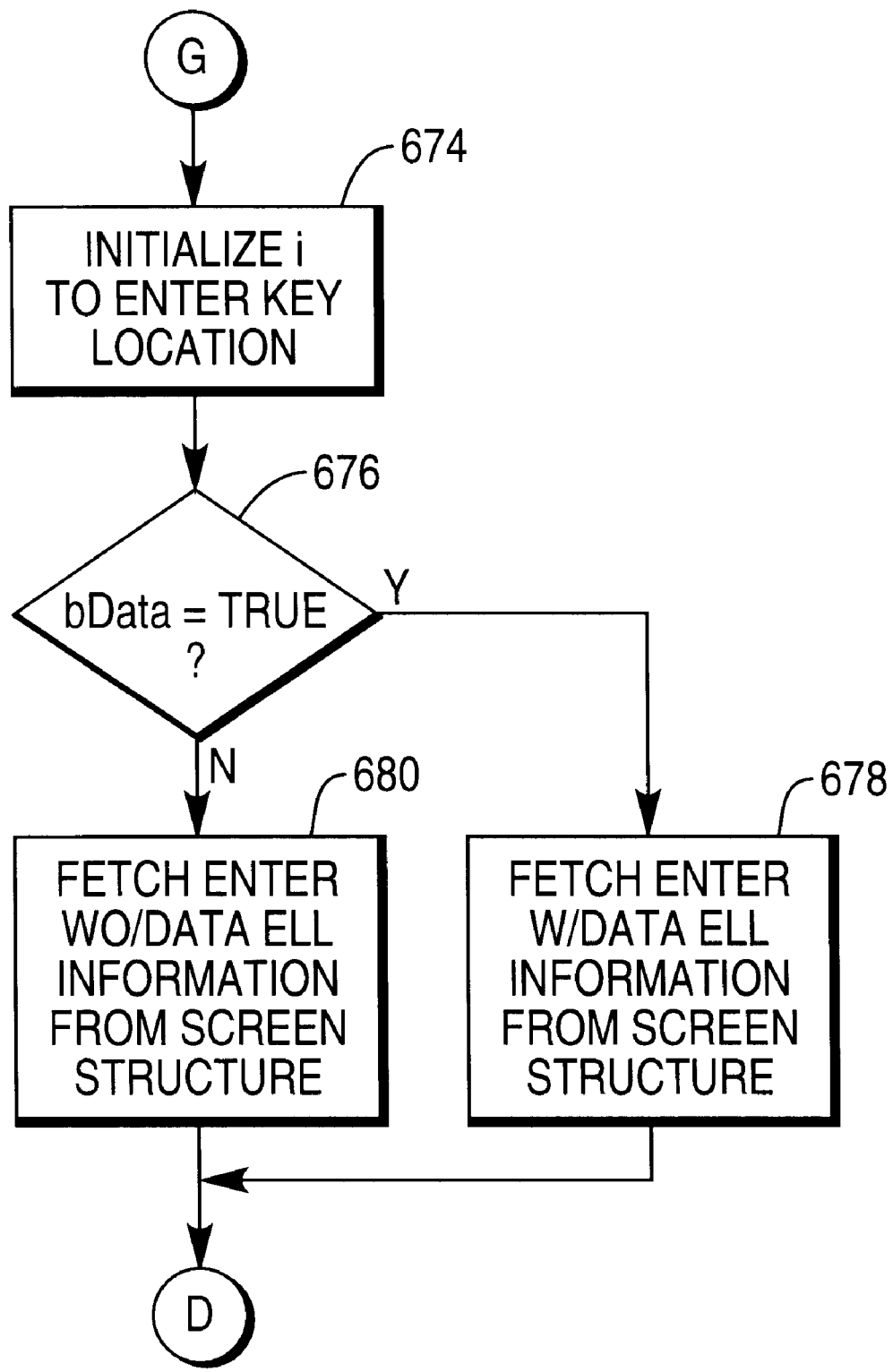

Connector G in FIG. 8F is reached when the "<Enter>" key is detected in FIG. 8B. The flowchart is very similar to the FIG. 8C flowchart, which has already been discussed. The only additional thing to mention is that since there are eight dynakeys, the <Enter> key can be viewed as the ninth "key". This is useful in fetching the ELL information from the ninth "key" because in block 674 the variable "i" can be set to 9. Once the <Enter> information is fetched from the appropriate place within the stored structure, then a branch is made to connector D, just as was done once the dynakey ELL information was retrieved. This concludes the FIG. 8F flowchart teaching.

Figure 8G:
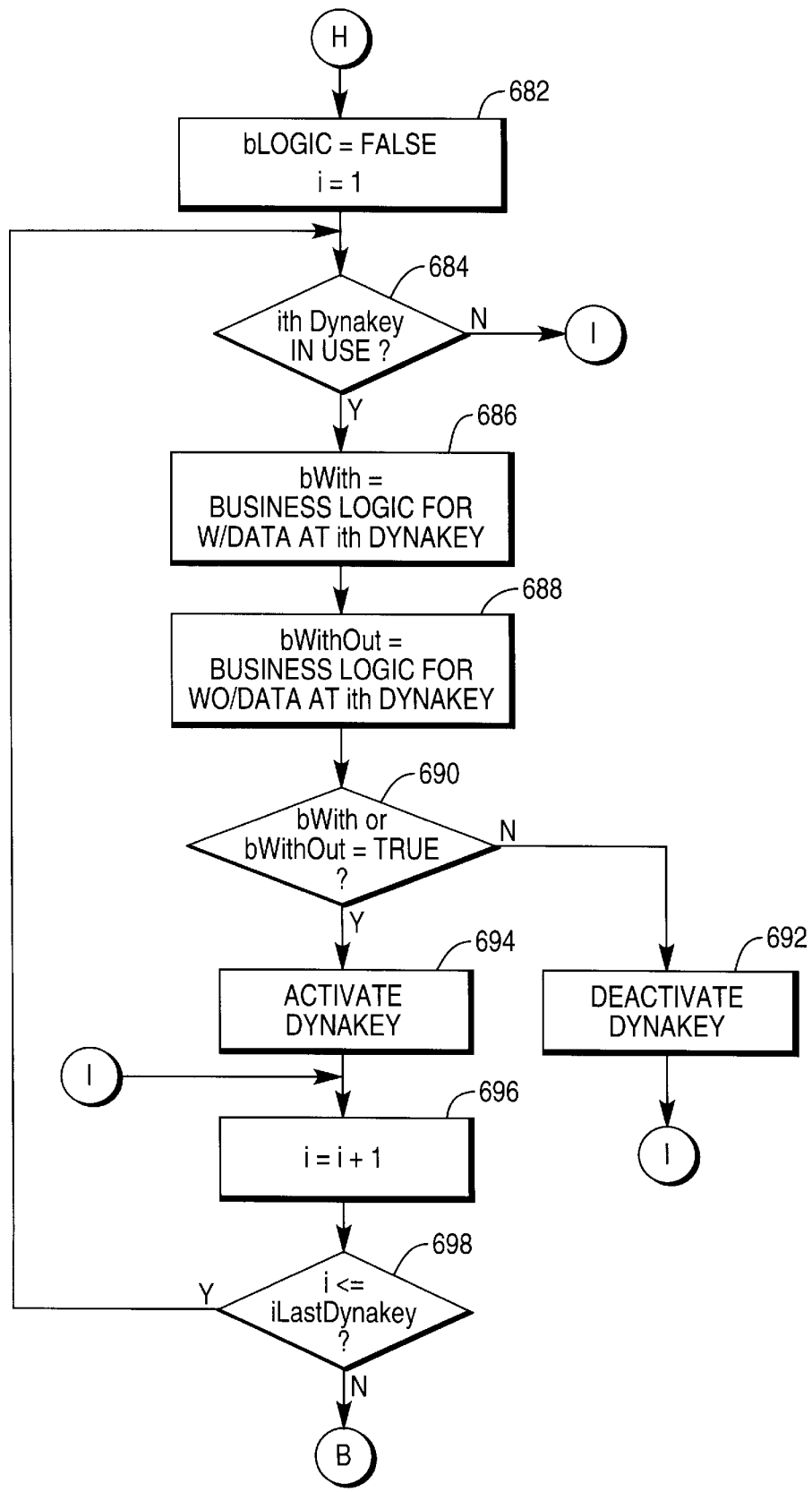

Connector H in FIG. 8G is reached when the "up" or "down" cursor keys are pressed and detected in FIG. 8B. Continuing, when block 682 is executed, the "bLogic" variable is given the value FALSE and the variable "i" is set to 1. The reason is that "i" governs the loop in blocks 684 through 698 where each dynakey is examined to see whether it should be active or inactive. Furthermore, by given "bLogic" a value of FALSE, the ELL function is invoked in its pre-condition state to see if can be executed or not. On the other hand, if the "bLogic" value is TRUE, then the ELL function is actually executed. In short, each ELL function has two states preceded by verification logic. For example, in FIG. 2A notice that the highlighted receipt item is a line associated with "BANANAS" (204B). Then, we know this item is a weighted item. Therefore, one should not be able to modify the quantity since it makes no sense. As a result, the first dynakey text "Item Quantity" appears in red. This means that dynakey 1 is inactive.

Continuing, block 684 is executed. If the result of this inquiry is "no", meaning the dynakey has no text, then a branch is made to connector I in FIG. 8G. Block 696 is executed next, and the variable "i" is incremented by 1. Next, block 698 is executed. If the result of the inquiry is "yes", then there are more dynakeys to consider and a branch is made back to block 684. If the result of the inquiry is "no", then all the dynakeys have been examined relative to the cursor movement and a branch is made to connector B is FIG. 8B to await more runtime events. Notice, that the actual cursor movement within the screen receipt is not done in <R> directly. Instead, it is done by a NICE DLL command.

Refer back to block 684. If the result of the inquiry is "yes", then blocks 686 and 688 are executed to obtain a particular dynakey's "with" and "without data" ELL result in the pre-condition state. That is, the execution of each ELL function returns a TRUE or FALSE value. Continuing, an inquiry is done at block 690. If the result of the inquiry is "no", then neither of the dynakey's ELL return values is TRUE. Therefore, block 692 is executed and the dynakey is made inactive via a Windows command to the NICE object residing on the DKItem/DKList screen. Then, a branch is made to connector I to see if there are more dynakeys to evaluate.

Refer back to block 690. If the result of the inquiry is "yes", then one of the dynakeys two ELL functions can be executed. Therefore, block 694 is executed and the dynakey text is activated. Then, as before, block 696 is executed to see if more dynakeys are to be considered.

A final word about the activating and deactivating of dynakey text. If the dynakey status is the same as before, then it is best not to do redundant work. Hence, an array is retained that allows <R> to check for this possibility. This concludes the FIG. 8G flowchart teaching.

Figure 8H:
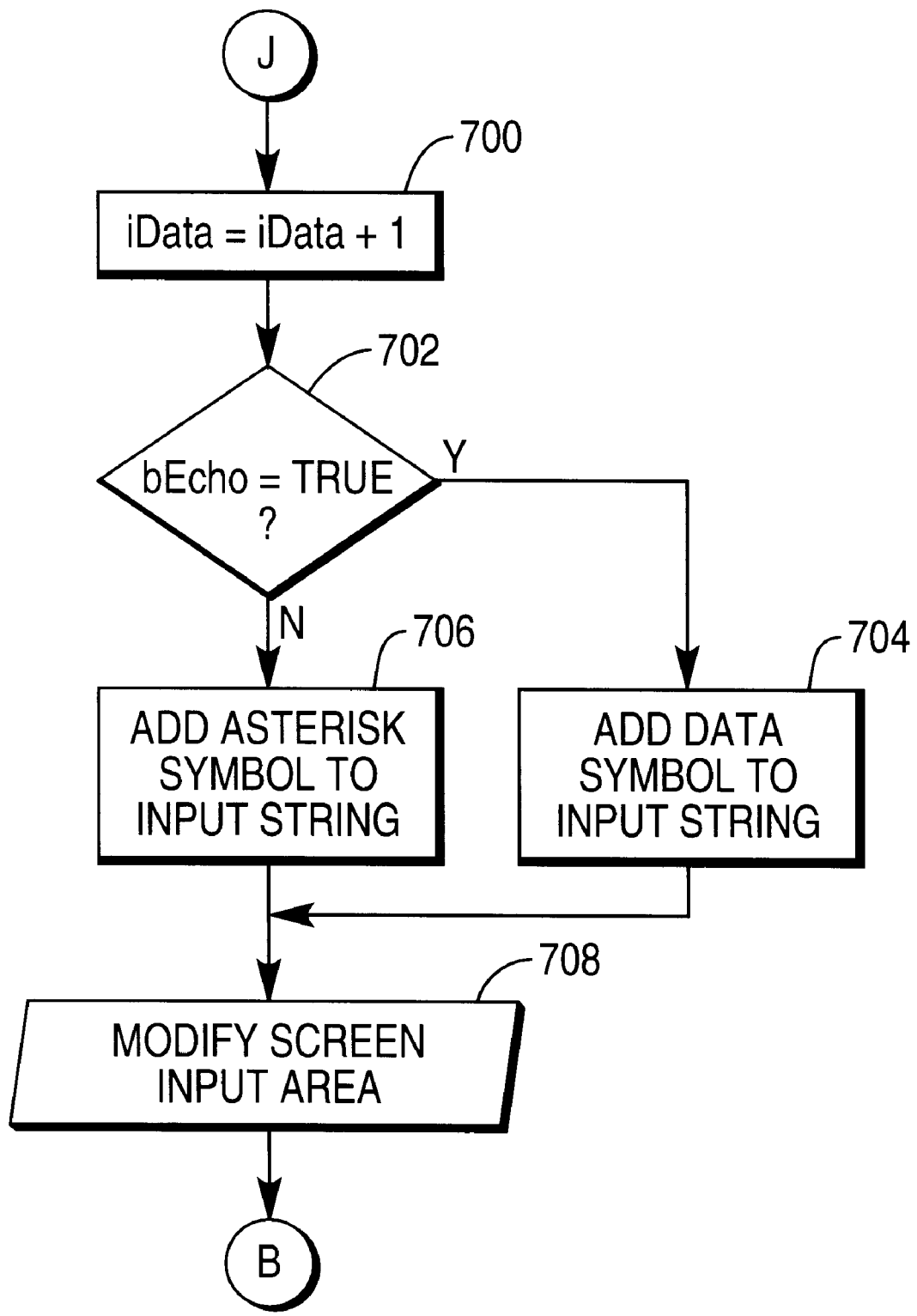

Connector J in FIG. 8H is reached when one of the DynaKey™ data keys is pressed and is detected in FIG. 8B. Continuing, block 700 is executed. Here, the variable "iData" is incremented by 1. The variable keeps track of how many input characters are in the input buffer. Next, block 702 is executed. The purpose of this inquiry is to see whether or not the data is to be echoed on the screen. The way this is implemented is to introduce an "Environment" dialog variable that can be checked for keyboard echoing and left blank otherwise. This proves to be a handy feature for password protection screens. Continuing, if the result of block 702's inquiry is "yes", then block 704 is executed. This causes the input symbol to be concatenated to the end of the current input string.

Refer back to block 702. If the result of the inquiry is "no", then block 706 is executing. This time the input symbol is not added to the input string, but instead an asterisk is concatenated. However, the actual input symbol is retained in another array. The enables a subsequent ELL function to utilize it later. Once block 706 or 704 are executed, block 708 is executed. This causes the input buffer contents to be displayed in the screen's input area. Lastly, a branch is made to connector B to await more runtime events. This concludes the FIG. 8H flowchart teaching.

Figure 8I:
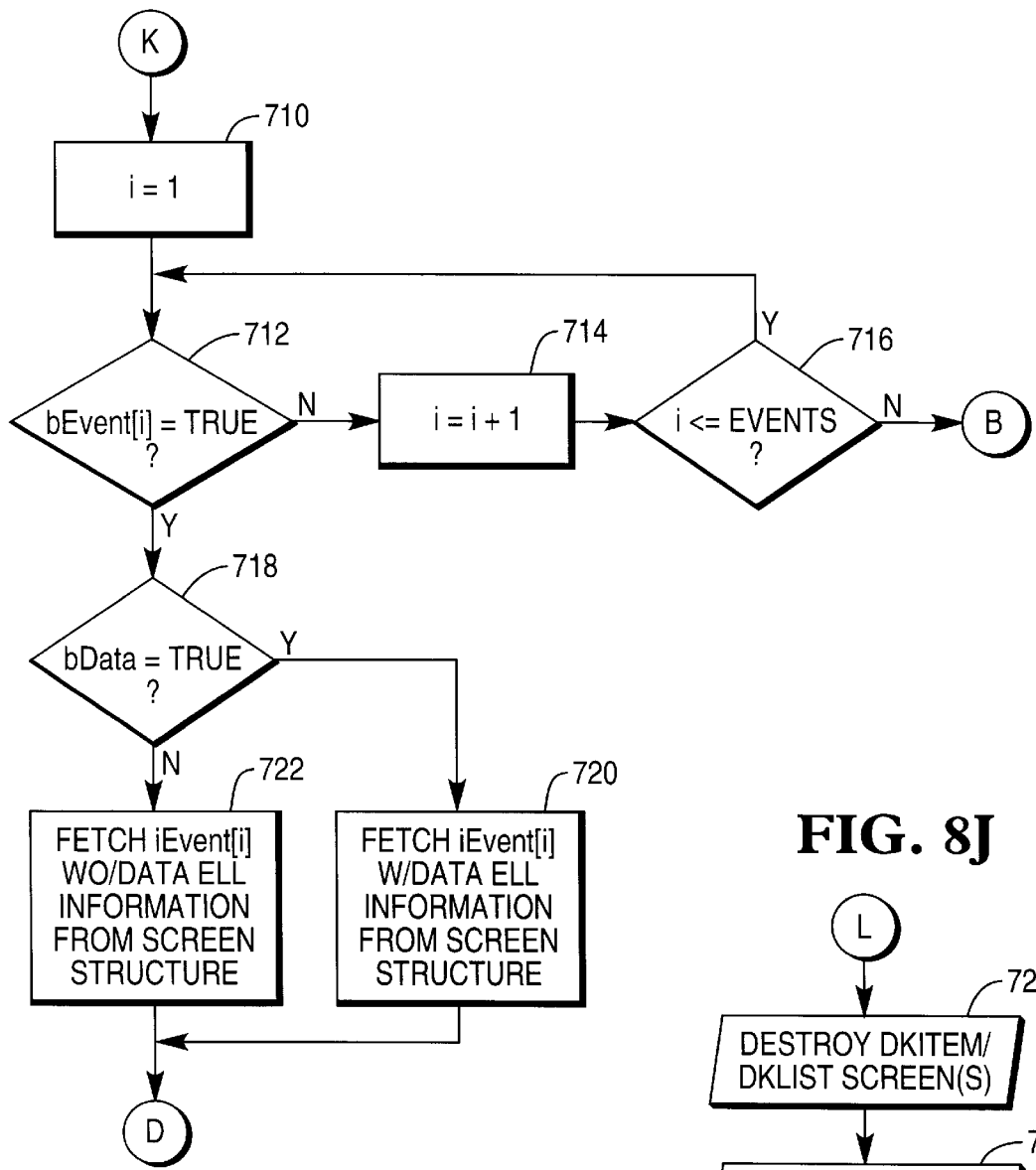

Connector K in FIG. 8I is reached when one of the POS peripheral or related events is detected in FIG. 8B. Before discussing the flowchart, a few comments about POS peripheral events. For devices such as the scanner, MSR, MICR, and printer, the NICE access libraries communicate with the drivers to send and receive messages, some of which are forwarded to <R>'s event-handler function. But there are other logical events to consider. These are also viewed as peripheral events, since they are not dynakey or <Enter> event. For example, consider FIG. 2D. When tendering is begun, typically the cash drawer 40 is popped open. Then, the "Additional Payment" DKItem screen 241 may appear to allow the operator to change the payment amount. However, the cash drawer 40 is still open. When it finally is closed, the next screen should appear automatically. Therefore, to handle this requirement a "peripheral" event is introduced as follows.

First, the ELL function that precedes the displaying of the screen 241 shown in FIG. 2D sends a unique message to the <R>'s event-handler function. The procedure then essentially establishes a loop by repeatedly sending the same event message until the cash drawer is closed. But suppose some DynaKey™ input to be entered while the FIG. 2D screen is displayed. The solution is to give Windows a change to run while the "cash drawer" event loop is active. In this way, when the cash drawer is finally closed, the event is processed just like any other logical event. To allow <B> to provide ELL information to <R>, the "Environment" dialog screen can include a list box for the cash drawer just like for the scanner, etc. Once this list box is checked, then the subsequent <B> Layout Menu selections can be used to assign an ELL function, global branching, and local branching to the event just like was done for the scanner, etc.

To understand another kind of peripheral event, consider the screen 251 shown in FIG. 2E. Suppose an ELL function first prints the face of a check. Then, after the check printing is finished, the "Check Removal" DKItem screen is displayed. This screen instructs the operator to remove the check from the printer. But when this happens, a subsequent screen should be displayed without additional operator intervention. To solve this problem in the most general way, a "Form_Out" event list box is added to the "Environment" dialog. Then, as was done for the "cash drawer" event, the box can be checked as required.

A less obvious kind of event, which we also classify as a peripheral event, is a "Null_Action" event. For example, consider FIG. 2F again. Notice, that a message is given in the receipt area 265. This message is displayed after the screen 261 is displayed on the DynaKey™. But no common runtime event causes this to happen. Therefore, to handle this problem a dummy event ocurrs after screen creation. In particular, a "Null_Action" list box is added to the "Environment" dialog. When checked, this "peripheral" event can be given an ELL function, global branching, and local branching. Of course, the global branching in this case will probably never be used and the local branching will be to the same screen. In short, when <R> creates this screen and the appropriate "Environment" variable has been checked in <B>, then a dummy message is sent to the event-handler function. In this way, the beginning screen logic can be performed.

In short, the peripheral events are comprised of the runtime events not associated with events triggered by the operator pressing a "key". Strictly speaking, though, not all the events are really peripheral device events.

Continuing, once connector K is branched to, block 710 is executed. This cause the peripheral loop variable "i" to be given an initial value of 1. Next, block 712 is executed. If the result of the inquiry is "no", then the peripheral event is not the ith one, and block 714 is executed. Here, the loop variable "i" is incremented by 1. Next, an inquiry is done at block 716. If the result of the inquiry is "yes", then more peripheral events need to be checked and a branch is made back to block 712. If the result of the inquiry is "no", then a particular peripheral event is not detected and a branch is made back to connector B in FIG. 8B to await more runtime events. This branch should never be taken, but is included for completeness.

Refer back to block 712 in FIG. 8I. If the result of the inquiry is "yes", then the peripheral event just detected in FIG. 8B is the ith event, where the proper value is now stored in the variable "i". Continuing, block 718 is executed. If the result of the inquiry is "yes", then the "iEvent[i]" variable value is used to retrieve from the interface structure the ELL information with respect to its "with data" state in block 720. One implementation for this retrieval algorithm is to have the first peripheral list box on <B>'s "Environment" dialog map to a value for "i" of 10, since the first eight dynakeys and <Enter> key already utilize the first nine values. This approach allows the interface structure for a screen to have an embedded array of structure for the ELL data information.

Refer back to block 718. If the result of the inquiry is "no", then the ith event's ELL information is fetched from the "without data" state for the event in block 722. Then, after block 722 or 720 is executed, a branch is made to connector D in FIG. 8D to perform the ELL work. This flowchart has already been discussed when a dynakey event was processed. This concludes the FIG. 8I teaching.

Figure 8J:
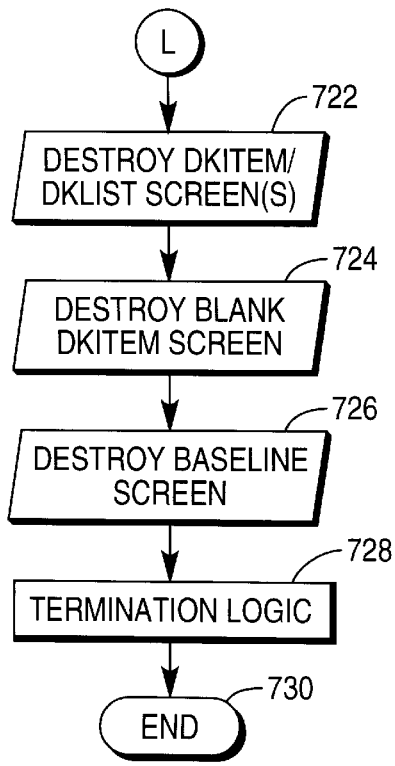

Connector L in FIG. 8J reached from FIG. 8B if one of the ELL functions sends a message to Windows indicating the program is to be terminated. This flowchart is the last <R> flowchart. Continuing, block 722 is executed and all the DKItem/DKList interface screens are destroyed. Next, block 724 is executed and the blank DKItem is destroyed. Then, block 726 is executed and the baseline screen that is hidden is destroyed. Finally, blocks 728 and 730 are executed and the <R> termination logic is performed and the program ends. The termination logic can include any disconnect logic to peripherals, LAN, etc. This concludes the <R> interface integration teaching.

While the invention has been described in detail with specific reference to preferred embodiments thereof, it is understood that variations and modifications thereof may be made without departing from the spirit and scope of the invention

We claim:

1. A system for creating a graphical user interface in a computer system, the graphical user interface comprising one or more interface controls, a screen set, a screen type and screen text, the system comprising:
   (a) means for creating a file containing a plurality of entries, wherein at at least one entry is associated with an interface control, wherein at least one entry is associated with a screen set, wherein at least one entry is associated with a screen type and wherein at least one entry is associated with a screen text,, the means for creating a file comprising:
      (i) means for selecting the interface controls, wherein at least one of the interface controls is associated with a function,
      (i) means for selecting the screen set,
      (ii) means for selecting the screen type,
      (iii) means for selecting the screen text,
   (b) means for storing the file;
   (c) means for displaying a graphical representation of the interface controls and the screen text to a user of the system based upon the screen set and the screen type;
   (d) means for selecting one of the interface controls responsive to the user of the system, wherein the selecting means is associated with the selected interface control; and
   (e) run-time means, independently operative of the means for creating the file, for:
      (i) reading each of the entries in the file from the storing means,
      (ii) performing the function associated in the file with the interface control selected by the selecting means.

2. The system of claim 1, further comprising means for testing the integrity of the file.

3. The system of claim 2, further comprising means for:
   (1) reading each of the entries in the file from the storing means,
   (2) displaying information on the video display regarding the interface control associated with each entry, and
   (3) displaying information on the video display regarding the function associated with each interface control.

4. The system of claim 1, wherein the creating means comprises a personal computer.

5. The system of claim 1, wherein the storing means comprises a disk drive.

6. The system of claim 1, wherein the displaying means comprises a Dynakey, and the selecting means comprises a switch associated with the Dynakey.

7. The system of claim 1, wherein the run-time means comprises a PC-compatible computer.

8. A method for creating a graphical user interface in a computer system, the graphical user interface comprising one or more interface controls, a screen set, a screen type and screen text, the method comprising:
   (a) creating a file containing a plurality of entries, wherein at least one entry is associated with an interface control, wherein at least one entry is associated with a screen set, wherein at least one entry is associated with a screen type and wherein at least one entry is associated with a screen text, wherein at least one of the interface controls is associated with a function, and wherein each of the entries in the file is capable of being read by a run-time system;
   (b) storing the file in a storage device coupled to the computer system;
   (c) displaying a graphical representation of the interface controls and the screen text to a user of the computer system based upon the screen set and the screen type;
   (d) selecting one of the interface controls responsive to the user of the computer system;
   (e) reading each of the entries in the file from the storing device; and
   (f) performing the function associated in the file with the selected interface control.

9. A method for creating a graphical user interface in a computer system, the graphical user interface comprising one or more interface controls, a screen set, a screen type and screen text and the computer system including a video display, the method comprising:
   (a) creating a file containing a plurality of entries, wherein at least one entry is associated with an interface control, wherein at least one entry is associated with a screen set, wherein at least one entry is associated with a screen type and wherein at least one entry is associated with a screen text, wherein at least one of the interface controls is associated with a function, and wherein each of the entries in the file is capable of being read by a run-time system;
   (b) storing the file in a storage device coupled to the computer system;
   (c) displaying a graphical representation of the interface controls and the screen text to a user of the computer system based upon the screen set and the screen type;
   (d) selecting one of the interface controls responsive to the user of the computer system;
   (e) reading each of the entries in the file from the storing device;
   (f) displaying information on the video display regarding the interface control associated with each entry; and
   (g) displaying information on the video display regarding the function associated with each interface control.

10. The system of claim 1 wherein the means for creating a file further comprises means for selecting one or more entry level logic functions, wherein each entry level logic function is contained within the file and readable by the run-time means.

11. The system of claim 1 wherein the displaying means comprises a point of sale terminal.

12. The system of claim 1 wherein at least one of the interface controls comprises means for entering a price of an item.

13. The system of claim 1 wherein at least one of the interface controls comprises means for branching to a second screen set.

* * * * *